(12) United States Patent
Bando et al.

(10) Patent No.: US 7,932,657 B2
(45) Date of Patent: Apr. 26, 2011

(54) ROTOR FOR ROTATING ELECTRICAL MACHINE

(75) Inventors: Masashi Bando, Saitama (JP); Noriyuki Abe, Saitama (JP); Shigemitsu Akutsu, Saitama (JP); Satoyoshi Oya, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 344 days.

(21) Appl. No.: 12/081,844

(22) Filed: Apr. 22, 2008

(65) Prior Publication Data

US 2008/0296997 A1   Dec. 4, 2008

(30) Foreign Application Priority Data

Apr. 23, 2007 (JP) ................... 2007-113037
Apr. 23, 2007 (JP) ................... 2007-113038
Apr. 23, 2007 (JP) ................... 2007-113039
May 15, 2007 (JP) ................... 2007-129639

(51) Int. Cl.
*H02K 21/12* (2006.01)

(52) U.S. Cl. ......... 310/156.08; 310/156.12; 310/156.16; 310/156.22; 310/261.1

(58) Field of Classification Search ............... 310/261.1, 310/267, 156.08, 156.12–156.14, 156.18–156.19, 310/156.16, 156.22
See application file for complete search history.

(56) References Cited

U.S. PATENT DOCUMENTS

2006/0061227 A1 * 3/2006 Heideman et al. ....... 310/156.56
2008/0169719 A1 * 7/2008 Yu ........................... 310/156.08

FOREIGN PATENT DOCUMENTS

| JP | 52-87603 | | 7/1977 |
|---|---|---|---|
| JP | 52087603 A | * | 7/1977 |
| JP | 63-290147 | | 11/1988 |
| JP | 8-111963 | | 4/1996 |
| JP | 9-9602 | | 1/1997 |
| JP | 2006-304409 | | 11/2006 |

OTHER PUBLICATIONS

International Search Report PCT/JP2008/057480 dated Jul. 15, 2008 with an English translation.

* cited by examiner

*Primary Examiner* — Quyen Leung
*Assistant Examiner* — Leda Pham
(74) *Attorney, Agent, or Firm* — Squire, Sanders & Dempsey (US) LLP

(57) ABSTRACT

A rotor body for an electric motor is comprised of connecting outer peripheral portions of first and second flange members made of electrically conductive material to the opposite ends of a plurality of connection members made of electrically conductive material of weak magnetic material arranged at predetermined distances therebetween in the circumferential direction with bolts and by supporting induction magnetic poles made of soft magnetic material between the connection members which are adjacent in the circumferential direction. Coupling portions of the first and second flange members and the connection member are electrically insulated by insulation coating so that an eddy current flowing in a closed circuit comprised of the first flange member, the connection member, the second flange member and the other connection member can be reduced and heat dissipation and energy loss accompanied by the eddy current can be minimized at the time of an operation.

7 Claims, 34 Drawing Sheets

MAGNETIC FIELD ROTATION DIRECTION

MAGNETIC CIRCUIT

MAGNETIC CIRCUIT

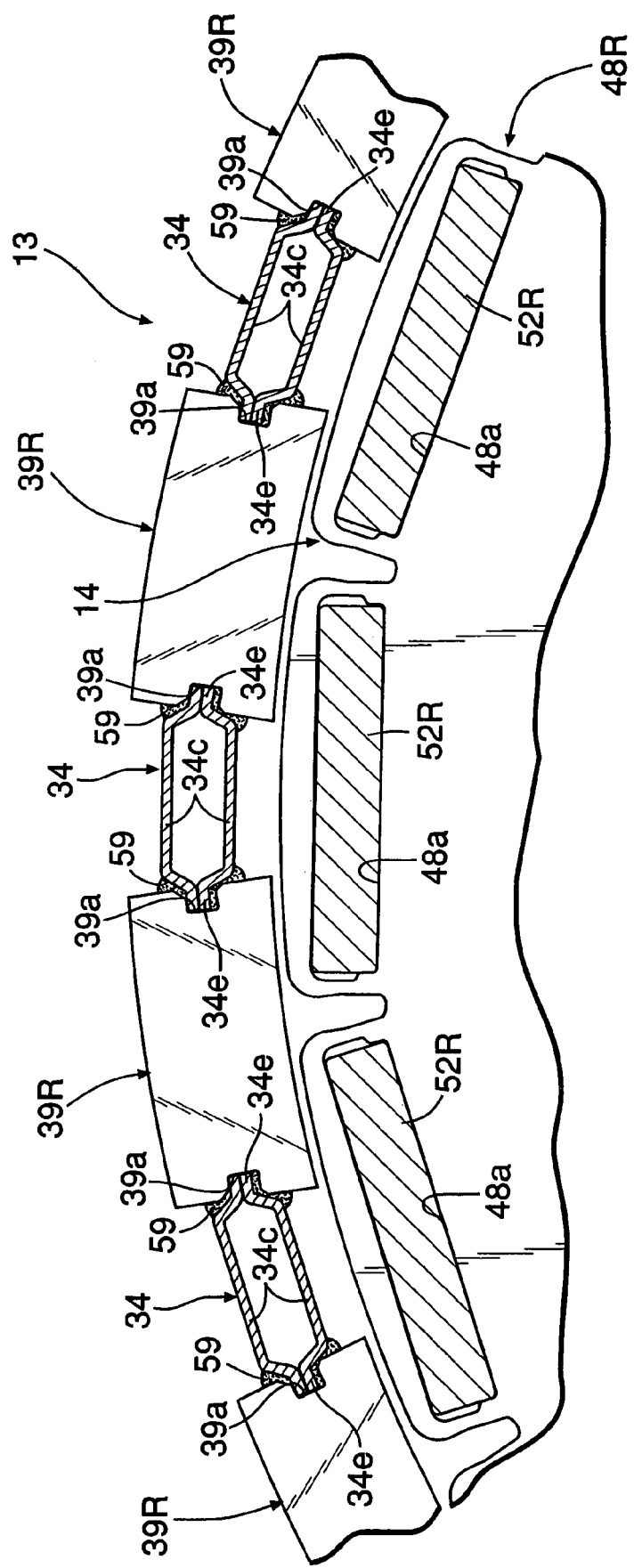

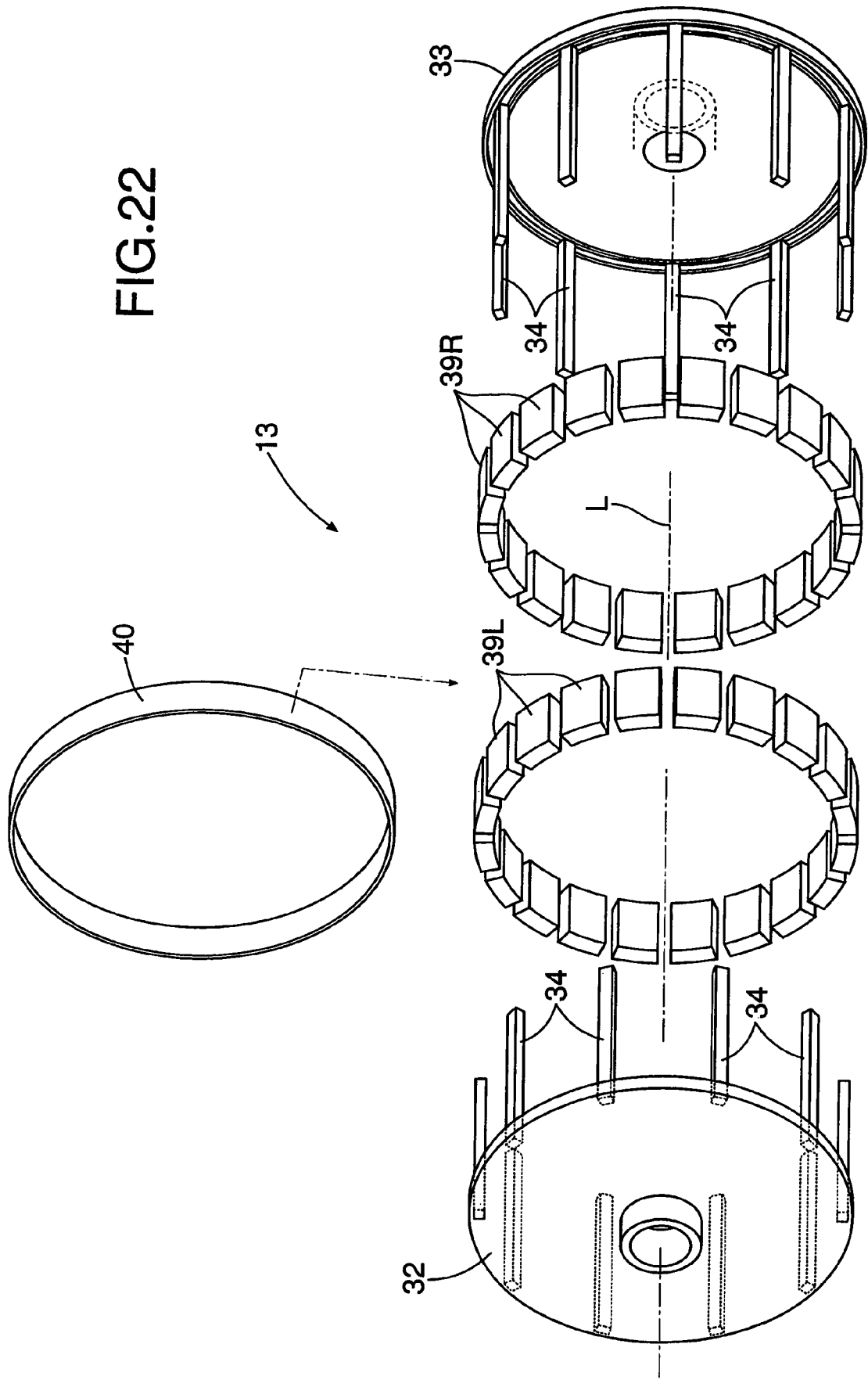

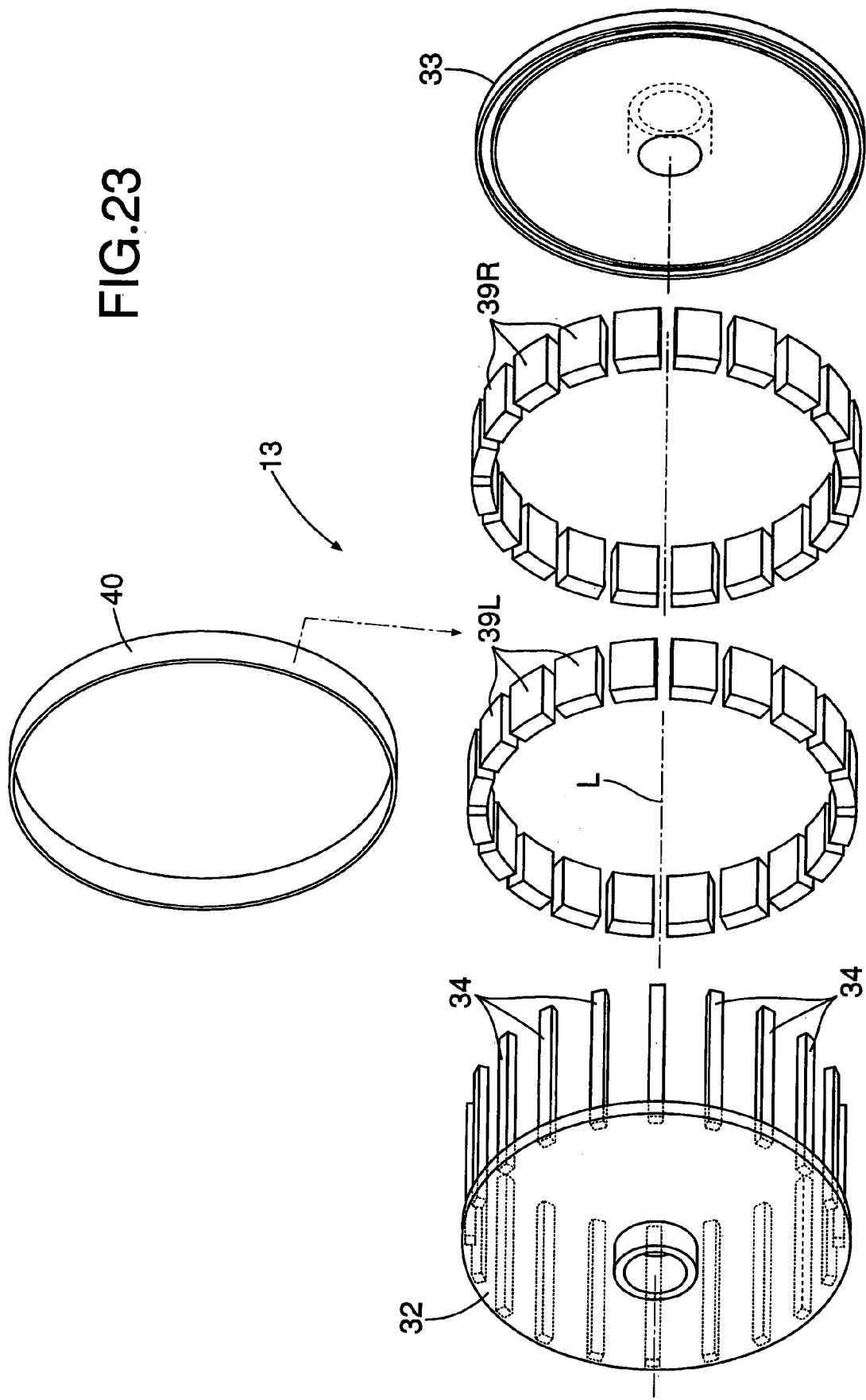

ROTOR FOR ROTATING ELECTRICAL MACHINE

BACKGROUND OF THE INVENTION

1. Field of the Invention

The present invention relates to a rotor for a rotating electrical machine, comprising: a first flange member and a second flange member comprised of an electrically conductive material and arranged so as to face each other on a common axis with a space therebetween; a plurality of connection members comprised of an electrically conductive weak magnetic material and arranged at predetermined distances therebetween in a circumferential direction with the axis being a center; outer peripheral portions of the first flange member and the second flange member being connected together by the connection members to support induction magnetic poles formed of a soft magnetic material between the connection members which are adjacent in the circumferential direction.

In addition, the present invention relates to a rotor for a rotating electrical machine, which is formed of a basket-shape rotating around an axis and supports a plurality of magnetic poles on its outer circumferential portion.

In addition, the present invention relates to a rotor for a rotating electrical machine, comprising: a first flange member and a second flange member rotatably arranged around a common axis; a plurality of connection members being arranged around the axis at predetermined distances therebetween in a circumferential direction and bringing the outer peripheral portions of the first and the second flange members into connection; and a magnetic pole supported between the connection members which are adjacent in the circumferential direction.

In addition, the present invention relates to a rotor for a rotating electrical machine formed of a basket-shape rotating around the axis, the rotor supporting a plurality of induction magnetic poles on the outer peripheral portion.

2. Description of the Related Art

A biaxial output type electric motor is known from Japanese Patent Application Laid-open No. 8-111963, wherein a toroidal stator having a plurality of armatures to generate a revolving magnetic field is fixed to a casing, a first rotor having a plurality of permanent magnets supported in its outer periphery is rotatably supported inside the stator, a cylindrical second rotor supporting a plurality of induction magnetic poles made of soft magnetic material is rotatably supported between the stator and the first rotor, so that outputs are taken out of the first rotor and the second rotor separately.

The second rotor of the biaxial output type electric motor described in Japanese Patent Application Laid-open No. 8-111963 is comprised of two disk-shaped rotor frames brought into connection with each other by a plurality of stick-shaped fixing members so as to be a basket-shape to support a soft magnetic material between fixing members which are adjacent in the circumferential direction. However, in the second rotor, since connection parts of the two rotor frames and opposite ends of the plurality of fixing members are not insulated, an eddy current generated at the time of operation flows in a closed circuit comprised of one rotor frame, a fixing member, the other rotor frame and the other fixing member, giving rise to possibility of significant heat dissipation and energy loss.

In addition, the second rotor of the biaxial output type electric motor described in the Japanese Patent Application Laid-open No. 8-111963 is comprised of a plurality of induction magnetic pole supporting portions that integrally protrudes in the axial direction from the outer peripheral portions of two disk-shaped first and second rotor frames arranged so as to face each other and the induction magnetic pole being sandwiched between a tip end of the induction magnetic pole supporting portion of the first rotor frame and a tip end of the induction magnetic pole supporting portion of the second rotor frame and fixing by a bolt. Consequently, the shapes of the first and second rotor frames get complicated to give rise to not only a problem that mass-productivity drops to cause a price increase but also a possibility of making fixation of its induction magnetic pole unstable if there is dispersion in dimensions in the axial direction of a plurality of induction magnetic poles to create a clearance between the induction magnetic pole which is short in dimension and the first and second rotor frames. Moreover, the shapes of the first and second rotor frames get complicated to give rise to not only a problem that mass-productivity drops to cause a price increase but also a possibility of generating significant heat and energy loss since the connection portions between the two rotor frames and the opposite ends of a plurality of induction magnetic pole supporting portions are not insulated so that an eddy current generated at the time of an operation flows in a closed circuit comprised of one rotor frame, a fixing member, the other rotor frame and the other fixing member.

SUMMARY OF THE INVENTION

A first object of the present invention was attained in view of such circumstances, and is to minimize an eddy current generated in a rotor of a rotating electrical machine to reduce heat dissipation and energy loss.

In addition, a second object of the present invention is to improve mass-productivity of a rotor of a rotating electrical machine to accomplish reduction in cost.

In addition, a third object of the present invention is to enable magnetic poles with dispersion in dimension to be stably fixed to a rotor of a rotating electrical machine.

In addition, a fourth object of the present invention is to minimize an eddy current generated in a rotor of a rotating electrical machine to reduce heat dissipation and energy loss and to improve mass-productivity of a rotor to plan reduction in cost.

In order to achieve the above-mentioned first object, according to a first feature of the present invention, there is provided a rotor for a rotating electrical machine, comprising: a first flange member and a second flange member comprised of an electrically conductive material and arranged so as to face each other on a common axis with a space therebetween; a plurality of connection members comprised of an electrically conductive weak magnetic material and arranged at predetermined distances therebetween in a circumferential direction with the axis being a center; outer peripheral portions of the first flange member and the second flange member being connected together by the connection members to support induction magnetic poles formed of a soft magnetic material between the connection members which are adjacent in the circumferential direction, wherein the first and second flange members are electrically insulated from each other.

With the first feature of the present invention, in a rotor for a rotating electrical machine wherein outer peripheral portions a first flange member and a second flange member made of electrically conductive material are connected together by a plurality of connection members made of weak magnetic electrically conductive material arranged at predetermined distances therebetween in the circumferential direction to support an induction magnetic pole made of soft magnetic material between connection members which are adjacent in the circumferential direction, the first flange member and the second flange member are electrically insulated to each other. Therefore, an eddy current flowing in a closed circuit comprised of the first flange member, one connection member, the second flange member and the other connection member at the time of an operation can be reduced and heat dissipation and energy loss accompanied by the eddy current can be minimized.

According to a second feature of the present invention, in addition to the first feature, at a portion where the connection member contacts the induction magnetic poles, a thickness of the connection member in a radial direction is smaller than a thickness of the induction magnetic poles in the radial direction.

With the second feature of the present invention, thickness of a connection member in the radial direction is made smaller than thickness of an induction magnetic pole in a portion bringing the connection member and the induction magnetic pole into contact. Therefore, a sectional area of the connection member can be made small and the eddy current can be further decreased.

According to a third feature of the present invention, in addition to the first feature, the connection member is made of stainless steel.

With the third feature of the present invention, the connection member is made of stainless steel. Therefore, not only its electrical resistance value gets high to suppress the eddy current but also material is inexpensive and can be processed easily.

According to a fourth feature of the present invention, in addition to the first feature, the connection member is made of aluminum or aluminum alloy.

With the fourth feature of the present invention, the connection member is made of aluminum or aluminum alloy. Therefore, material is inexpensive and light and can be processed easily. Moreover, surface treatment for cutting the eddy current is easy.

According to a fifth feature of the present invention, in addition to the first feature, the connection member is made of titanium or titanium alloy.

With the fifth feature of the present invention, the connection member is made of titan or titanic alloy. Therefore, not only its electrical resistance value gets high to suppress the eddy current but also a weight is light compared with its strength so that reduction in weight and volume of a rotor can be accomplished.

According to a sixth feature of the present invention, in addition to the first feature, insulating treatment is applied to a surface of the connection member.

With the sixth feature of the present invention, insulation treatment is applied to the surface of the connection member. Therefore, the contact part between the connection member and the flange member is insulted without using a special insulating member to enable reduction in the eddy current.

Here, in the first to sixth first features hereof, the first induction magnetic pole 39L and the second induction magnetic pole 39R of an embodiment corresponds to an induction magnetic pole of the present invention.

In order to achieve the above-mentioned second object, according to a seventh feature of the present invention, there is provided a rotor for a rotating electrical machine, comprising: a first flange member and a second flange member arranged so as to be capable of rotating around a common axis; a plurality of connection members formed of a weak magnetic material and arranged at predetermined distances therebetween in a circumferential direction with the axis being a center; and magnetic poles, wherein opposite ends of the connection members are respectively fixed to outer peripheral portions of the first flange member and the second flange member to support the magnetic poles between the connection members which are adjacent in the circumferential direction.

With the seventh feature of the present invention, a rotor for a rotating electrical machine is comprised of a first flange member and a second flange member, and a plurality of connection members bringing outer peripheral portions of the first and second flange members into connection in a separate manner. Therefore, shapes of the first flange member, the second flange member and the connection members can be simplified to reduce production costs. Moreover, since a magnetic pole is supported between adjacent connection members, the magnetic pole can be reliably and easily supported.

According to an eighth feature of the present invention, in addition to the seventh feature, the magnetic poles are induction magnetic poles made of a soft magnetic material.

With the eighth feature of the present invention, a magnetic pole of a rotor for a rotating electrical machine is comprised of soft magnetic material. Therefore, rotation of the rotor is capable of magnetizing soft magnetic material to function as an induction magnetic pole.

According to a ninth feature of the present invention, in addition to the seventh feature, a ring made of a weak magnetic material is arranged on an outer periphery of the plurality of connection members.

With the ninth feature of the present invention, a plurality of connection members are provided with rings made of weak magnetic material which are arranged in the outer peripheries of the connection members. Therefore, centrifugal force applied to the connection members accompanied by the rotor rotates is supported by the rings and, thereby, a deformation of the connection members can be suppressed.

According to a tenth feature of the present invention, in addition to the seventh feature, the magnetic poles are arranged in plurality at predetermined distances therebetween in the direction of the axis.

With the tenth feature of the present invention, a plurality of magnetic poles is arranged in the axial direction at predetermined distances therebetween. Therefore, large torque can be generated in the rotor.

According to a eleventh feature of the present invention, in addition to the ninth feature, the magnetic poles are arranged in plurality at predetermined distances therebetween in the direction of the axis and the ring is arranged between the plurality of magnetic poles which are adjacent in the direction of the axis.

With the eleventh feature of the present invention, a plurality of magnetic poles is arranged in the axial direction at predetermined distances therebetween. Therefore, large torque can be generated in the rotor. Moreover, since the ring is arranged between a plurality of magnetic poles which abut each other in the axial direction, the rings can effectively support centrifugal force applied to a plurality of magnetic poles to be capable of suppressing a deformation of the connection members.

According to a twelfth feature of the present invention, in addition to the seventh feature, the first flange member, the second flange member and the connection member are formed of an electrically conductive material and insulating treatment is applied to a surface of at least one of the members.

With the twelfth feature of the present invention, insulation treatment is applied to a surface of at least one of a first flange member, a second flange member and connection members formed of electrically conductive material. Therefore, an eddy current flowing in a closed circuit comprised of the first flange member, one connection member, the second flange member and the other connection member at the time of an operation can be reduced and heat dissipation and energy loss accompanied by the eddy current can be minimized.

According to a thirteenth feature of the present invention, in addition to the seventh feature, a plurality of positioning holes and a plurality of bolt holes are coaxially formed in outer peripheral portions of the first flange member and the second flange member at predetermined distances therebetween in the circumferential direction and bolts inserted through the bolt holes are screwed into female screw parts formed in opposite ends of the connection member in a state where the opposite ends of the connection members are respectively fitted to the positioning holes.

With the thirteenth feature of the present invention, a plurality of positioning holes and a plurality of bolt holes are coaxially formed in outer peripheral portions of a first and a second flange members in the circumferential direction at predetermined distances therebetween and a bolt inserted in the bolt hole is screwed into a female screw part formed in the opposite ends of the connection member in the state where the opposite ends of the connection members are fit to the respective positioning holes. Therefore, the connection members can be positioned precisely and strongly fixed to the first and the second flange members with the bolt and a highly accurate and highly rigid rotor is obtainable.

According to a fourteenth feature of the present invention, in addition to the thirteenth feature, the bolts are formed of an electrically conductive material and the bolts and the first and second flange members respectively sandwich an insulating washer therebetween.

With the fourteenth feature of the present invention, bolts formed of electrically conductive material and a first and a second flange members sandwich an insulating washer. Therefore, it is possible to prevent the first flange member and the second flange member reliably from being brought into an electrically conductive state with the connection members through the bolt.

Here, in the seventh to fourteenth features hereof, the first induction magnetic pole 39L and the second induction magnetic pole 39R of an embodiment corresponds to a magnetic pole or an induction magnetic pole of the present invention.

In order to achieve the above-mentioned third object, according to a fifteenth feature of the present invention, there is provided a rotor for a rotating electrical machine, comprising: a first flange member and a second flange member arranged so as to be capable of rotating around a common axis; a plurality of connection members arranged at predetermined distances therebetween in a circumferential direction with the axis being a center to connect outer peripheral portions of the first and second flange members together; and magnetic poles supported between the connection members which are adjacent in the circumferential direction, wherein the magnetic poles are movably supported by the connection members in the direction of the axis and the magnetic poles are biased and fixed in the direction of the axis with elastic members arranged between the magnetic poles and at least ones of the first and second flange members.

With the fifteenth feature of the present invention, outer peripheral portions of first and second flange members rotating on an axis are connected together by a plurality of connection members and a magnetic pole is biased in the axial direction and fixed with an elastic member arranged between the magnetic pole and at least one of the first flange member and the second flange member at the occasion of movably supporting the magnetic pole between the connection members which are adjacent in the axial direction. Therefore, even if there is dispersion in dimensions of the magnetic pole in the axial direction, that magnetic pole can be fixed stably in simple structure.

According to a sixteenth feature of the present invention, in addition to the fifteenth feature, the magnetic pole is induction magnetic poles made of a soft magnetic material.

With the sixteenth feature of the present invention, a magnetic pole of a rotor for a rotating electrical machine is comprised of soft magnetic material. Therefore, a rotation of the rotor can magnetize the soft magnetic material to function as an induction magnetic pole.

According to a seventeenth feature of the present invention, in addition to the fifteenth feature, the magnetic pole comprises a first magnetic pole and a second magnetic pole which are arranged in parallel in the direction of the axis and a ring sandwiched by the first and second magnetic poles to function as a spacer is arranged in a radially outer periphery of the connection member.

With the seventeenth feature of the present invention, a ring being sandwiched by a first magnetic pole and a second magnetic pole arranged in parallel in the axial direction to function as a spacer is arranged in the radially outer periphery of a connection member. Therefore, both the first and second magnetic poles can be positioned in the axial direction through a ring. Moreover, centrifugal force applied to a connection member can be supported by the ring.

According to an eighteenth feature of the present invention, in addition to the seventeenth feature, a first elastic member is arranged between the first flange member and the first magnetic pole, and a second elastic member is arranged between the second flange member and the second magnetic pole.

With the eighteenth feature of the present invention, a first elastic member is arranged between a first flange member and a first magnetic pole and a second elastic member is arranged between a second flange member and a second magnetic pole. Therefore, the first and the second elastic members bias and push the first and the second magnetic poles in the mutually approaching direction to the opposite side edges of the ring. Thereby both the first and the second magnetic poles can be positioned reliably in the axial direction.

According to a nineteenth feature of the present invention, in addition to the eighteenth feature, at least one rotation-stopping protrusion is provided to protrude on a side edge of the ring and the rotation-stopping protrusion is brought into engagement between a pair of the adjacent first magnetic poles or between a pair of the adjacent second magnetic poles.

With the nineteenth feature of the present invention, a rotation-stopping protrusion protruding on one side edge of a ring is engaged between a pair of adjacent first magnetic poles or between a pair of adjacent second magnetic poles. Therefore, the ring can be positioned in the circumferential direction for a rotor.

According to a twentieth feature of the present invention, in addition to the eighteenth feature, a latching protrusion engaged with a side edge of the ring on a side of the second flange member is provided in at least one of the connection members and elastic force of the first elastic member is set stronger than elastic force of the second elastic member.

With the twentieth feature of the present invention, a connection member is provided with an engagement protrusion engaged with a side edge on a second flange member of a ring. Therefore, it is possible to push the first magnetic pole with the first elastic member on the side with the strong elastic force to press and position the ring onto the engagement protrusion of the connection member in the axial direction and to push the second magnetic pole with the second elastic member on the side with the weak elastic force to push and position the ring in the axial direction. Thereby, an accuracy in positioning the first and the second magnetic poles in the axial direction for a rotor can be enhanced.

According to a twenty first feature of the present invention, in addition to the twentieth feature, a positioning groove is formed on a side edge of the ring on a side of the second flange member and the latching protrusion is engaged with the positioning groove.

With the twenty first feature of the present invention, a positioning groove formed on a side edge on the second flange member side of the ring is brought into engagement to an engagement protrusion of a connection member. Therefore, a rotation of the ring can be stopped by utilizing the engagement protrusion of the connection member.

Here, in the fifteenth to twenty first features hereof, the first induction magnetic pole 39L and the second induction magnetic pole 39R of an embodiment corresponds to a magnetic pole or an induction magnetic pole of the present invention. The first spring 41L and the second spring 41R of the embodiment correspond to elastic members of the present invention.

In order to achieve the above-mentioned fourth object, according to a twenty second feature of the present invention, there is provided a first flange member and a second flange member arranged so as to be capable of rotating around a common axis; a cylindrical member formed of an electrically non-conductive material; and induction magnetic poles made of a soft magnetic material, wherein outer peripheral portions of the first and second flange members are connected together by the cylindrical member to support the induction magnetic poles at predetermined distances therebetween in the circumferential direction with the axis being a center.

With the twenty second feature of the present invention, a cylindrical member bringing a first flange member and a second flange member rotating around an axis into connection in their outer peripheral portions is formed of non-electrically conductive material and an induction magnetic pole made of soft magnetic material is supported by the cylindrical member in the circumferential direction on the axis as a center at predetermined distances therebetween. Therefore, the first and the second flange members are electrically insulated with the cylindrical member allowing no current to flow, and an eddy current flowing in a closed circuit comprised of the first flange member, the second flange member and the cylindrical members is reduced at the time of an operation. Thereby, heat dissipation and energy loss accompanied by the eddy current can be minimized.

According to a twenty third feature of the present invention, in addition to the twenty second feature, the cylindrical member is made of resin and the induction magnetic poles are integrated with the cylindrical member at the time of molding the cylindrical member.

With the twenty third feature of the present invention, a cylindrical member is molded with resin and, at that occasion, the induction magnetic pole is integrated into the cylindrical member. Therefore, since not only the number of parts of the cylindrical member itself can be reduced by metal mold but also the fixing member of the induction magnetic pole onto the cylindrical member is no longer required, thereby mass-productivity of the rotor can be improved so that reduction in cost can be accomplished.

According to a twenty fourth feature of the present invention, in addition to the twenty second feature, the induction magnetic poles are exposed on an outer peripheral face of the cylindrical member.

With the twenty fourth feature of the present invention, an induction magnetic pole is exposed on an outer peripheral face of the cylindrical member. Therefore, it is possible to reduce an air gap on the outer peripheral side of the induction magnetic pole to enable improvement in magnetic efficiency.

According to a twenty fifth feature of the present invention, in addition to the twenty second feature, the induction magnetic poles are exposed on an inner peripheral face of the cylindrical member.

With the twenty fifth feature of the present invention, an induction magnetic pole is exposed on an inner peripheral face of the cylindrical member. Therefore, it is possible to reduce an air gap on the inner peripheral side of the induction magnetic pole to enable improvement in magnetic efficiency.

According to a twenty sixth feature of the present invention, in addition to the twenty second feature, the cylindrical member comprises: a pair of toroidal fixing portions fixed to the first and second flange members; and a plurality of stick-shaped induction magnetic pole supporting portions arranged at predetermined distances therebetween in the circumferential direction with the axis being a center and connected to the pair of fixing portions, wherein the induction magnetic poles are supported between the adjacent induction magnetic pole supporting portions.

With the twenty sixth feature of the present invention, a pair of toroidal fixing portions of the cylindrical member is brought into connection with a plurality of stick-shaped induction magnetic pole supporting portions arranged in a circumferential direction at predetermined distances therebetween to support the induction magnetic pole between adjacent induction magnetic pole supporting portions. Therefore, a cylindrical member in a simple shape can support the induction magnetic pole reliably and easily.

According to a twenty seventh feature of the present invention, in addition to the twenty second feature, a ring made of a weak magnetic material is arranged on an outer periphery of the cylindrical member.

With the twenty seventh feature of the present invention, a ring made of weak magnetic material is arranged on the outer periphery of the cylindrical member. Therefore, centrifugal force applied to the cylindrical member accompanied by rotation of a rotor is supported by the ring, thereby, deformation of the cylindrical member can be suppressed.

According to a twenty eighth feature of the present invention, in addition to the twenty seventh feature, the induction magnetic poles are arranged in plurality at predetermined distances therebetween in the direction of the axis and the ring is arranged between the plurality of adjacent induction magnetic poles in the direction of the axis.

With the twenty eighth feature of the present invention, a ring is arranged between induction magnetic poles arranged in plurality in the axial direction at predetermined distances therebetween. Therefore, centrifugal force applied to a plurality of induction magnetic poles is effectively supported by the ring, thereby, deformation of the cylindrical member can be suppressed.

Here, the first induction magnetic pole 39L and the second induction magnetic pole 39R of an embodiment corresponds to an induction magnetic pole of the present invention.

The above-mentioned object, other objects, characteristics, and advantages of the present invention will become apparent from an explanation of a preferred embodiments, which will be described in detail below by reference to the attached drawings.

BRIEF DESCRIPTION OF THE DRAWINGS

FIG. 21 is a diagram related to a second embodiment corresponding to FIG. 9.

FIG. 22 is an exploded perspective view of an outer rotor related to a third embodiment.

FIG. 23 is an exploded perspective view of an outer rotor related to a fourth embodiment.

DESCRIPTION OF THE PREFERRED EMBODIMENT

Embodiments of the present invention will be described below based on the accompanying drawings.

At first, a first embodiment of the present invention will be described based on FIG. 1 to 20.

Figure 10:
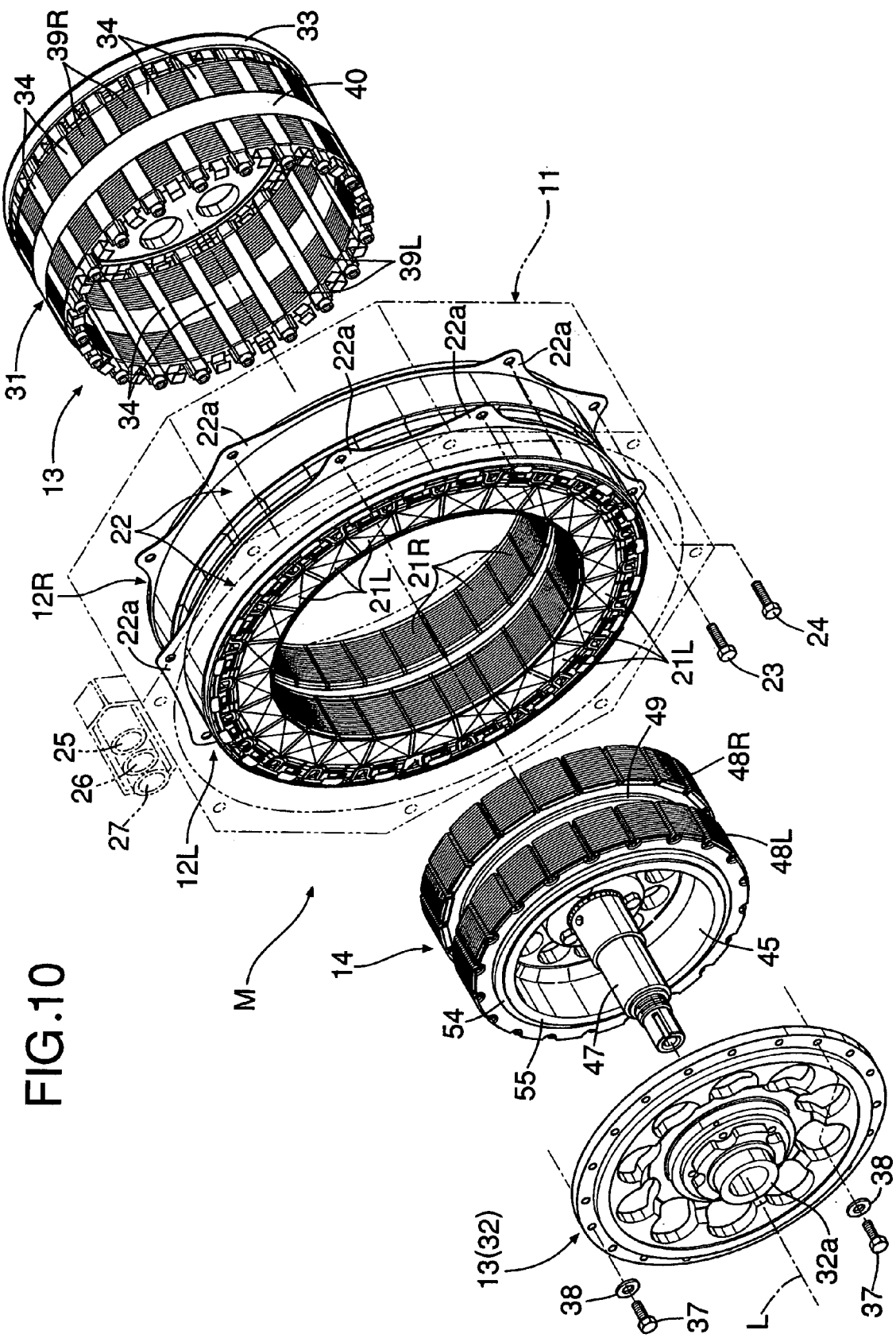
FIG. 10 is an exploded perspective view of an electric motor.
Figure 11:
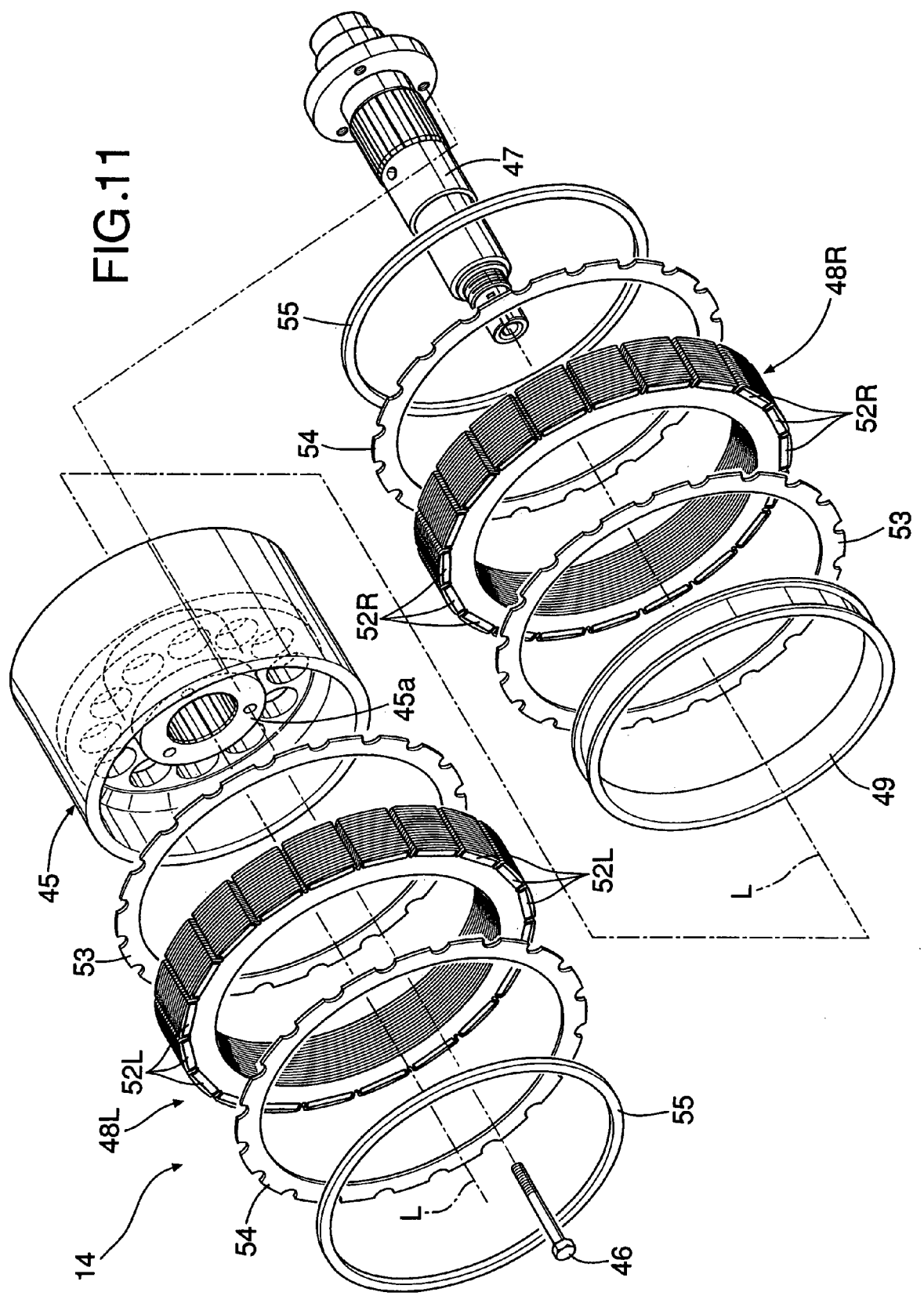
FIG. 11 is an exploded perspective view of an inner rotor.

As shown in FIG. 10, an electric motor M of the embodiment is comprised of a casing 11 comprises an octagonal shape being shorter in the direction of an axis L, circular toroidal first and second stators 12L and 12R fixed in the inner periphery of the casing 11, a cylindrical outer rotor 13 being housed inside the first and second stators 12L and 12R and rotating on the axis L and a cylindrical inner rotor 14 being housed inside the outer rotor 13 and rotating on the axis L. The outer rotor 13 and the inner rotor 14 are relatively rotatable to the first and second fixed stators 12L and 12R and the outer rotor 13 and the inner rotor 14 are mutually relatively rotatable.

Figure 1:
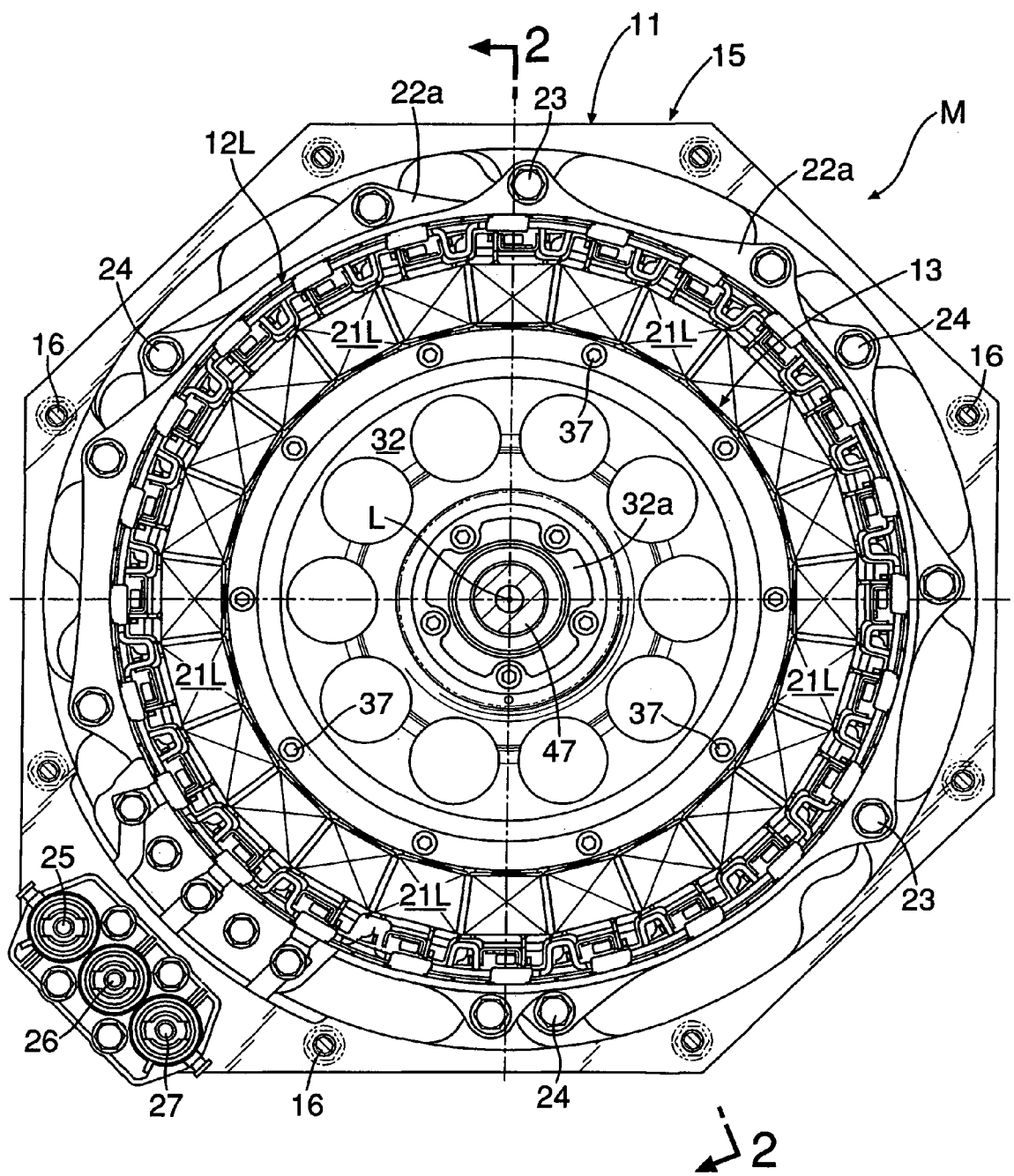
FIG. 1 is a front diagram (a view taken along the arrow direction of the line 1-1 in FIG. 2) of an electric motor related to a first embodiment taken in the direction of an axis.
Figure 2:
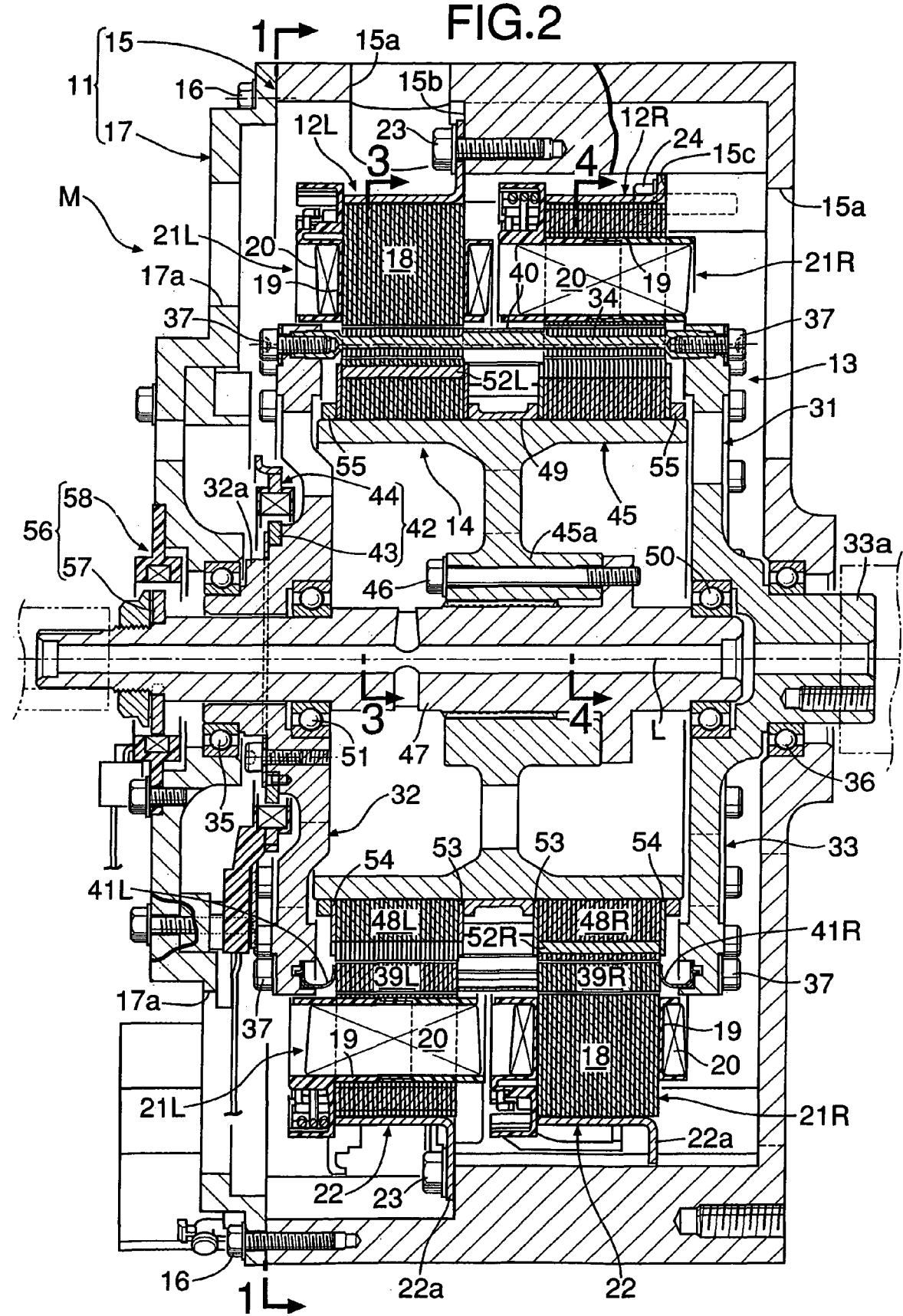
FIG. 2 is a sectional diagram taken along the line 2-2 in FIG. 1.

As illustrated in FIG. 1 and FIG. 2, the casing 11 is comprised of a main body part 15 having a bottomed octagonal cylinder shape and a lid portion 17 having an octagonal plate shape being fixed to an opening of the main body part 15 with a plurality of bolts 16. A plurality of openings 15a and 17a for ventilation is formed in the main body part 15 and the lid portion 17.

As illustrated in FIG. 1 to FIG. 4 and FIG. 10, the first and second stators 12L and 12R having the same structure are superimposed in the circumferential direction in a staggered manner. Structure of the first stator 12L being one of the stators will be described as an example. The first stator 12L comprises a plurality (24 pieces for the embodiment) of first armatures 21L including a coil 20 being wound in the outer periphery of a core 18 made of a stacked steel plate through an insulator 19. Those first armatures 21L are integrated with a ring-shaped holder 22 in the state of being combined in the circumferential direction so as to present a circular toroidal shape as a whole. Flanges 22a protruding in the radial direction from an end of the holder 22 in the direction of the axis L is fixed on a step part 15b (see FIG. 2) on the inner surface of the main body part 15 of the casing 11 with a plurality of bolts 23.

The second stator 12R comprises 24 pieces of second armatures 21R likewise the above-described first stator 12L. The flanges 22a of the holder 22 are fixed with a plurality of bolts 24 in a step part 15c (see FIG. 2) on the inner surface of the main body part 15 of the casing 11. At that time, the phases of the first stator 12L and the second stator 12R in the circumferential direction are staggered by a half portion of the pitches of first and second permanent magnets 52L and 52R of the inner rotor 14 (see FIG. 3 and FIG. 4). Three-phase alternating current is supplied to the first and second armatures 21L and 21R of the first and second stators 12L and 12R from three terminals 25, 26 and 27 (see FIG. 1) provided in the main body part 15 of the casing 11. Thereby, a revolving magnetic field can be generated in the first and second stators 12L and 12R.

As illustrated in FIG. 2 and FIG. 10, a basket-shaped rotor body 31 of the outer rotor 13 is comprised of assembling disk-shaped first and second flange members 32 and 33 comprised of iron or iron and steel being electrically conductive material and a plurality (20 pieces for the embodiment) of stick-shaped connection members 34 comprised of aluminum or aluminum alloy being electrically conductive weak magnetic material. A first outer rotor shaft 32a protruding from the center of the first flange member 32 on the axis L is rotatably supported by a ball bearing 35 in the lid portion 17 of the casing 11. A second outer rotor shaft 33a protruding from the center of the second flange member 33 on the axis L is rotatably supported by a ball bearing 36 in the main body part 15 of the casing 11. The second outer rotor shaft 33a to become an output shaft of the outer rotor 13 extends outside through the main body part 15 of the casing 11.

Weak magnetic material is material not absorbed by a magnet and, for example, includes resin and wood and the like in addition to aluminum and the like and is occasionally called as non-magnetic material.

The first and second flange members 32 and 33 are basically disk-shaped members. The connection member 34 is basically a stick-shaped member. Therefore, it becomes possible to use a metal mold with small and simple structure in the case of molding them with die casting, for example, so as to be capable of enhancing mass-productivity of the rotor body 31 to reduce the manufacturing cost.

Figure 12:
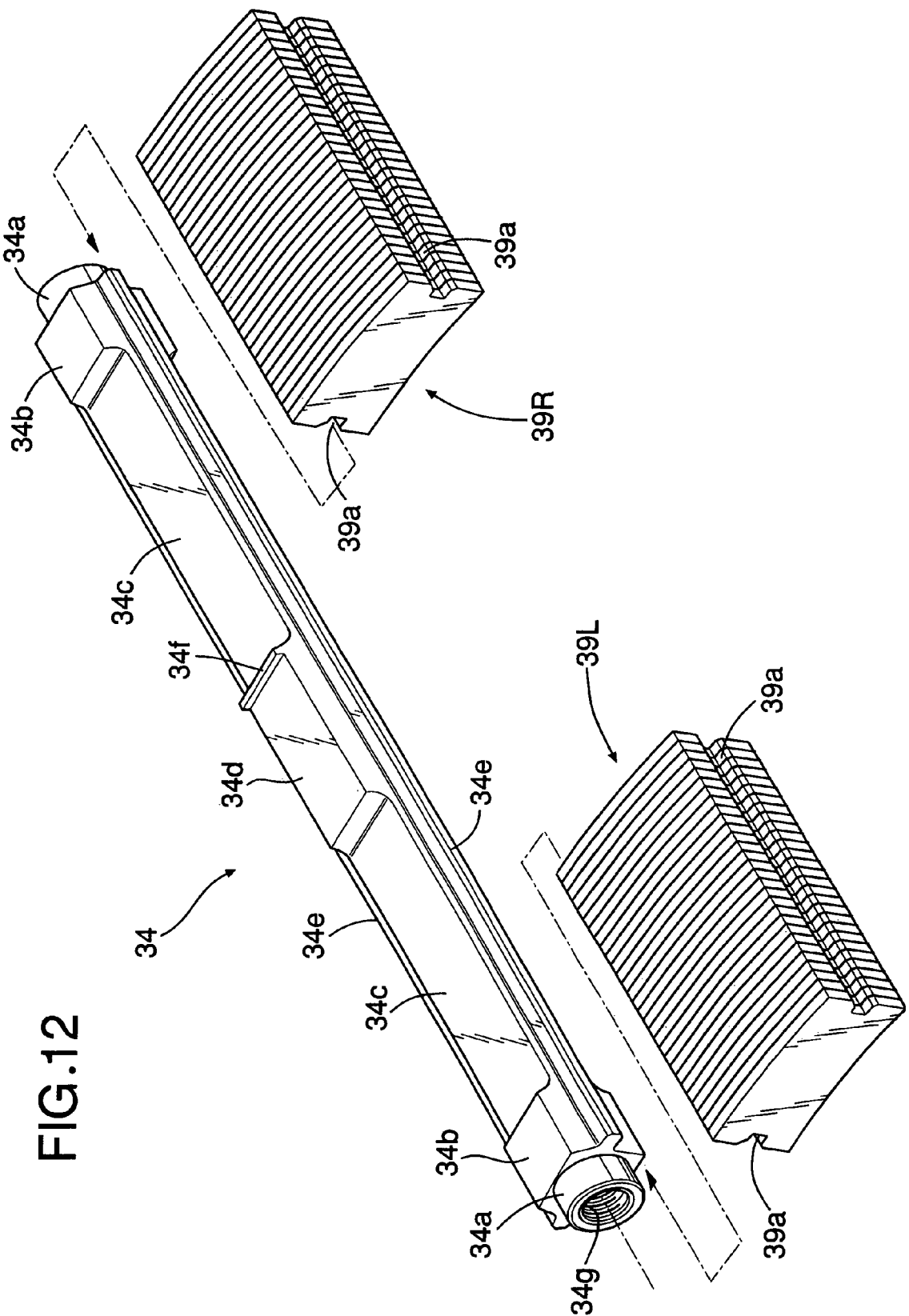
FIG. 12 is a perspective view of a connection member and an induction magnetic pole.
Figure 13:
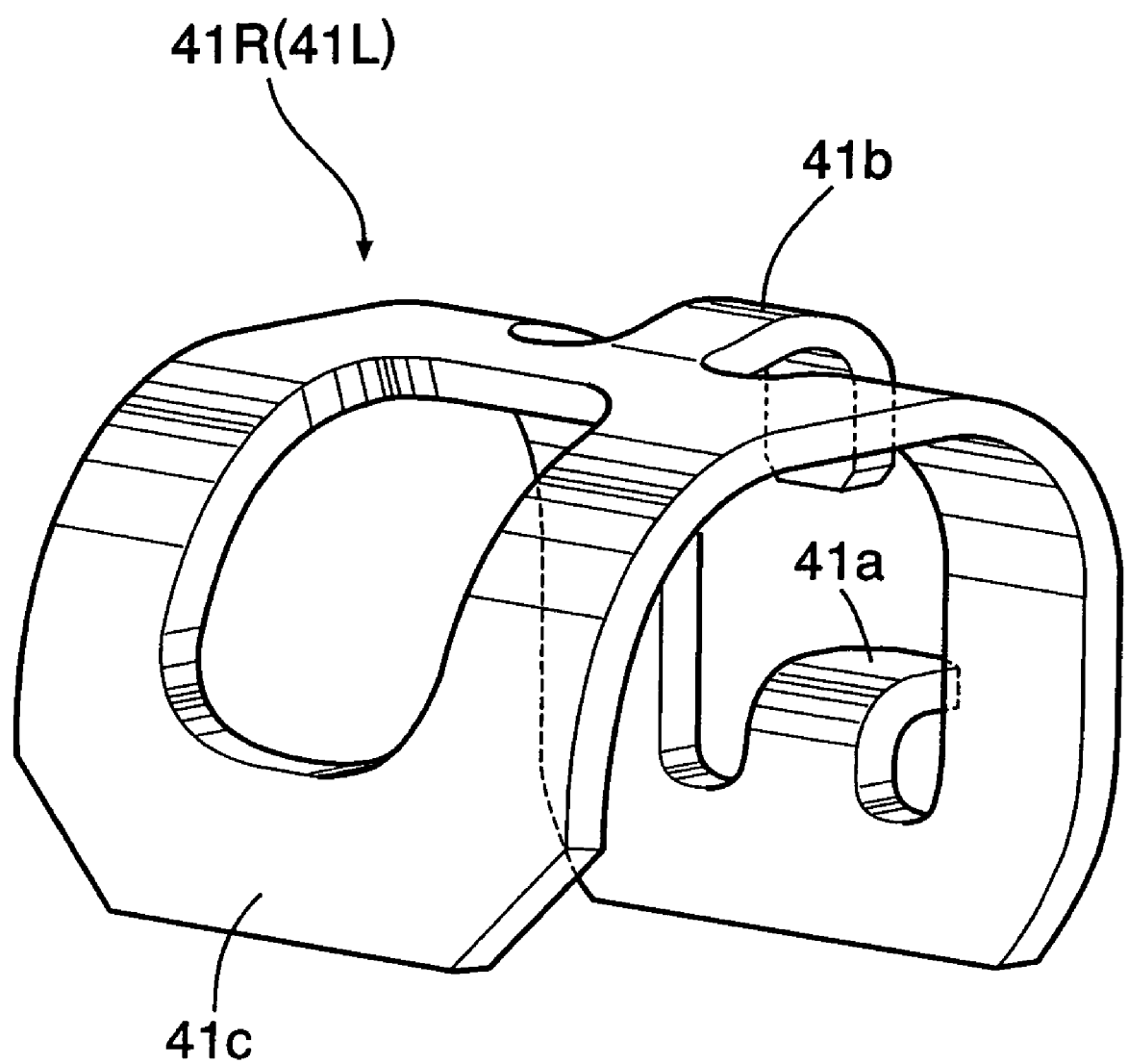
FIG. 13 is a perspective view of a spring.

As illustrated in FIG. 12, the connection member 34 comprises a pair of positioning portions 34a and 34a being shaped circularly in section and formed in the opposite ends, a pair of rotation-stopping portions 34b and 34b being shaped non-circularly in section and being continuously formed on its inner side, a pair of induction magnetic pole supporting portions 34c and 34c being continuously formed on its inner side, a ring supporting portion 34d thicker by one step being continuously formed in its inside and a ridge-shaped convex portions 34e and 34e having a quadrangular section provided to protrude on opposite side surfaces of the entire length excluding the positioning portions 34a and 34a. A latching protrusion 34f is provided to protrude outwards in the radial direction on the side of an end of the ring supporting portion 34d.

Figure 6:
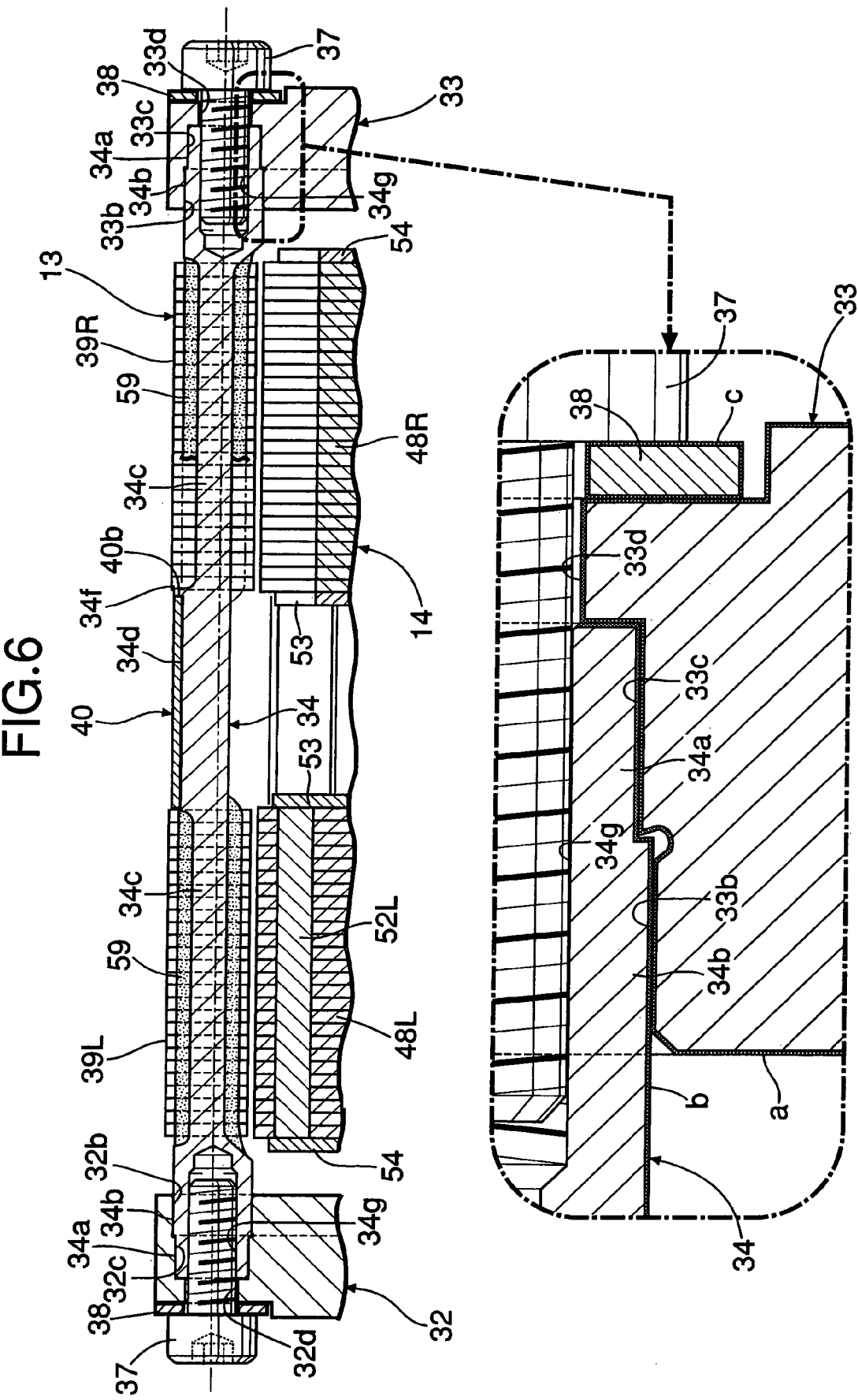
FIG. 6 is a sectional diagram taken along the line in FIG. 5.
Figure 7:
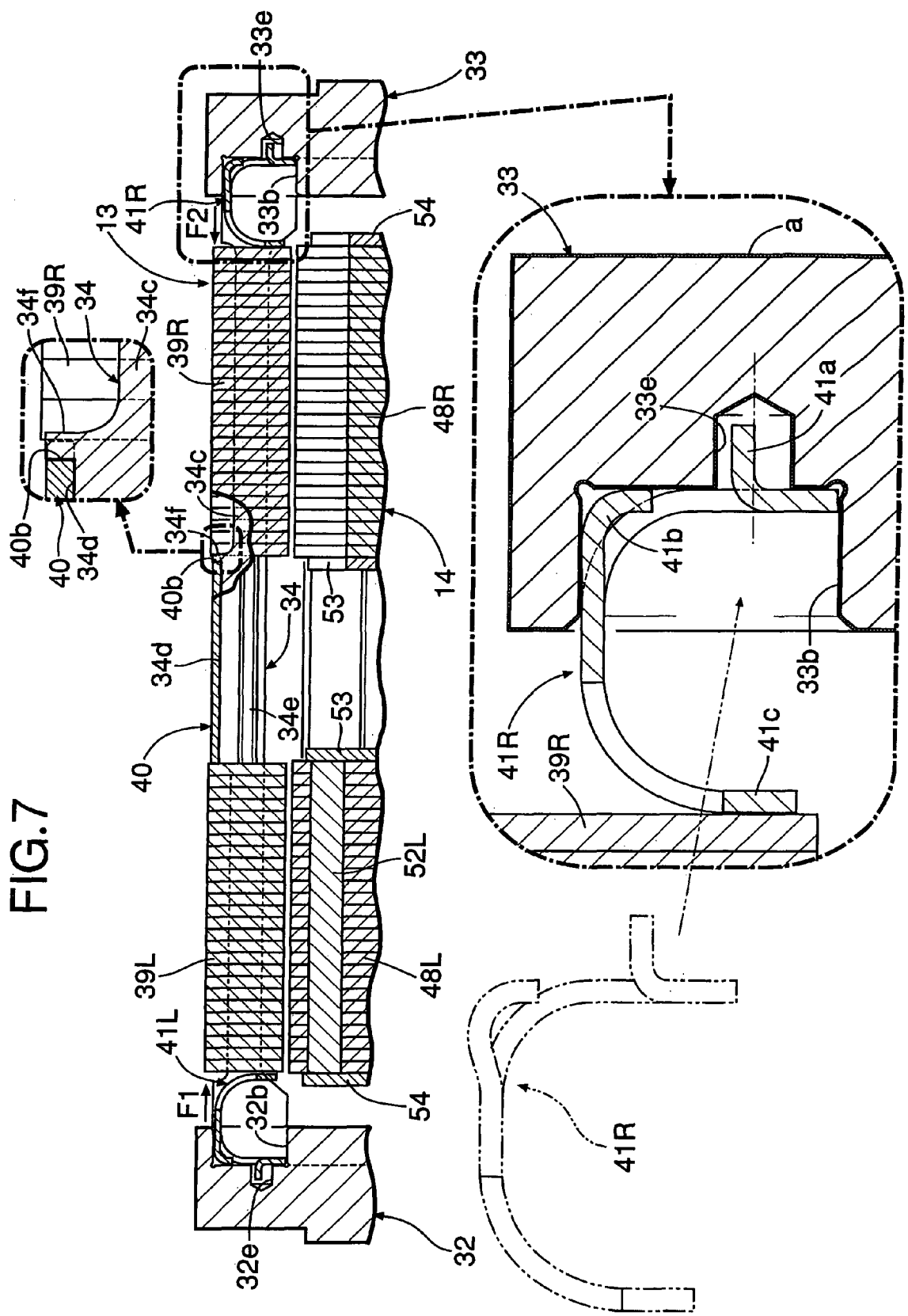
FIG. 7 is a sectional diagram taken along the line in FIG. 5.
Figure 8:
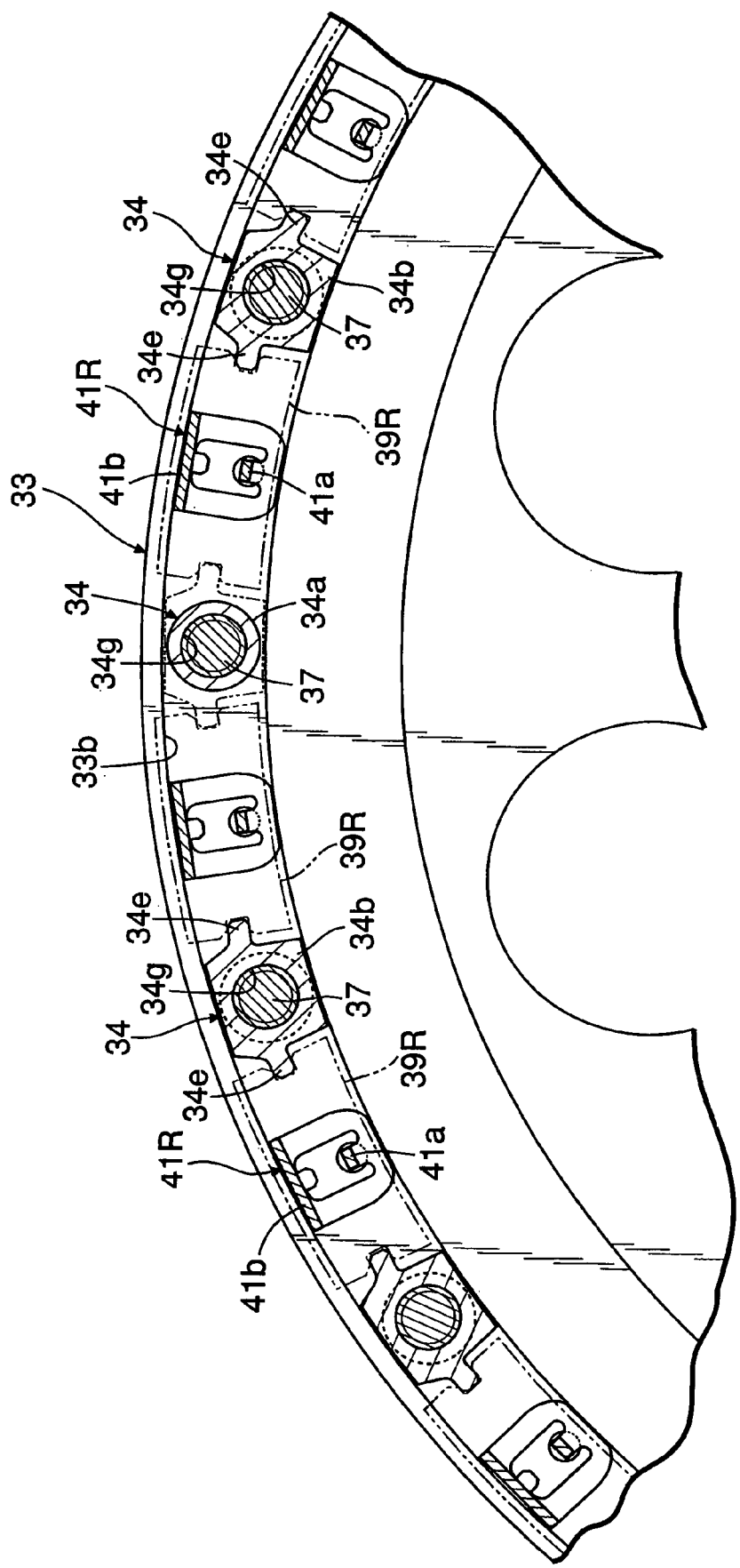
FIG. 8 is a sectional diagram taken along the line in FIG. 5.

As illustrated in FIG. 6 to FIG. 8, toroidal grooves 32b and 33b are formed on the inner surfaces of the outer peripheral portions of the first and second flange members 32 and 33. Positioning holes 32c and 33c having circular shapes in section are formed on the bottom portion of those toroidal grooves 32b and 33b. The bottom portion of those positioning holes 32c and 33c are communicated to the outer surface of the outer peripheral portion of the first and the second flange members 32 and 33 through bolt holes 32d and 33d. A bolt 37 is screwed into a female screw part 34g of the connection member 34 through the bolt hole 32d of a washer 38 and the first flange member 32 in the state where the rotation-stopping portion 34b and the positioning portion 34a on one end side of the connection member 34 are fit to the toroidal groove 32b and the positioning hole 32c of the first flange member 32 respectively. Thereby, the sides of one end of twenty connection members 34 are connected to the first flange member 32.

Likewise, the bolt 37 is screwed into a female screw part 34g of the connection member 34 through the bolt hole 33d of the washer 38 and the second flange member 33 in the state where the rotation-stopping portion 34b and the positioning portion 34a on the other end side of the connection member 34 are fit to the toroidal groove 33b and the positioning hole 33c of the second flange member 33 respectively. Thereby, the sides of the other end of twenty connection members 34 are connected to the second flange member 33. Consequently, a basket-shaped rotor body 31 is comprised of the first and second flange members 32 and 33 and twenty connection members 34.

At that time, the positioning portions 34a and 34a having circular shapes in section are fitted to the positioning holes 32c and 33c having circular shapes in section. Thereby, the positions of the connection members 34 for the first and second flange members 32 and 33 are precisely determined. The rotation-stopping portions 34b and 34b having non-circular shape in section are fit to the toroidal grooves 32b and 33b. Thereby, relative rotation of the connection members 34 for the first and second flange members 32 and 33 is restrained. As a result, by positioning the connection members 34 at a right angle for the first and second flange members 32 and 33, preciseness of assembly of the outer rotor 13 can be secured.

As illustrated in FIG. 6 in an enlarged manner, the surface of the second flange member 33 is coated with insulation coating a made of hard anodized aluminum. Likewise, the surfaces of the respective connection members 34 are coated with insulation coating b made of hard anodized aluminum. The iron-made washer 38 used at an occasion of fixing each connection member 34 to the second flange member 33 with the bolt 37 is coated with insulation coating c made of polyamide-imide on its surface. The bolt 37 is screwed to the female screw part 34g of the connection member 34 through the bolt hole 33d of the second flange member 33 with having a clearance therebetween. Accordingly, the right end of the connection member 34 and the second flange 33 is electrically insulated. With likewise structure, the left end of the connection member 34 and the first flange member 32 are electrically insulated. Thereby, the electrical closed circuit (see the arrows in FIG. 5) configured through the first flange member 32, the connection member 34, the second flange member 33 and the other connection member 34 can be reliably cut off.

Figure 5:
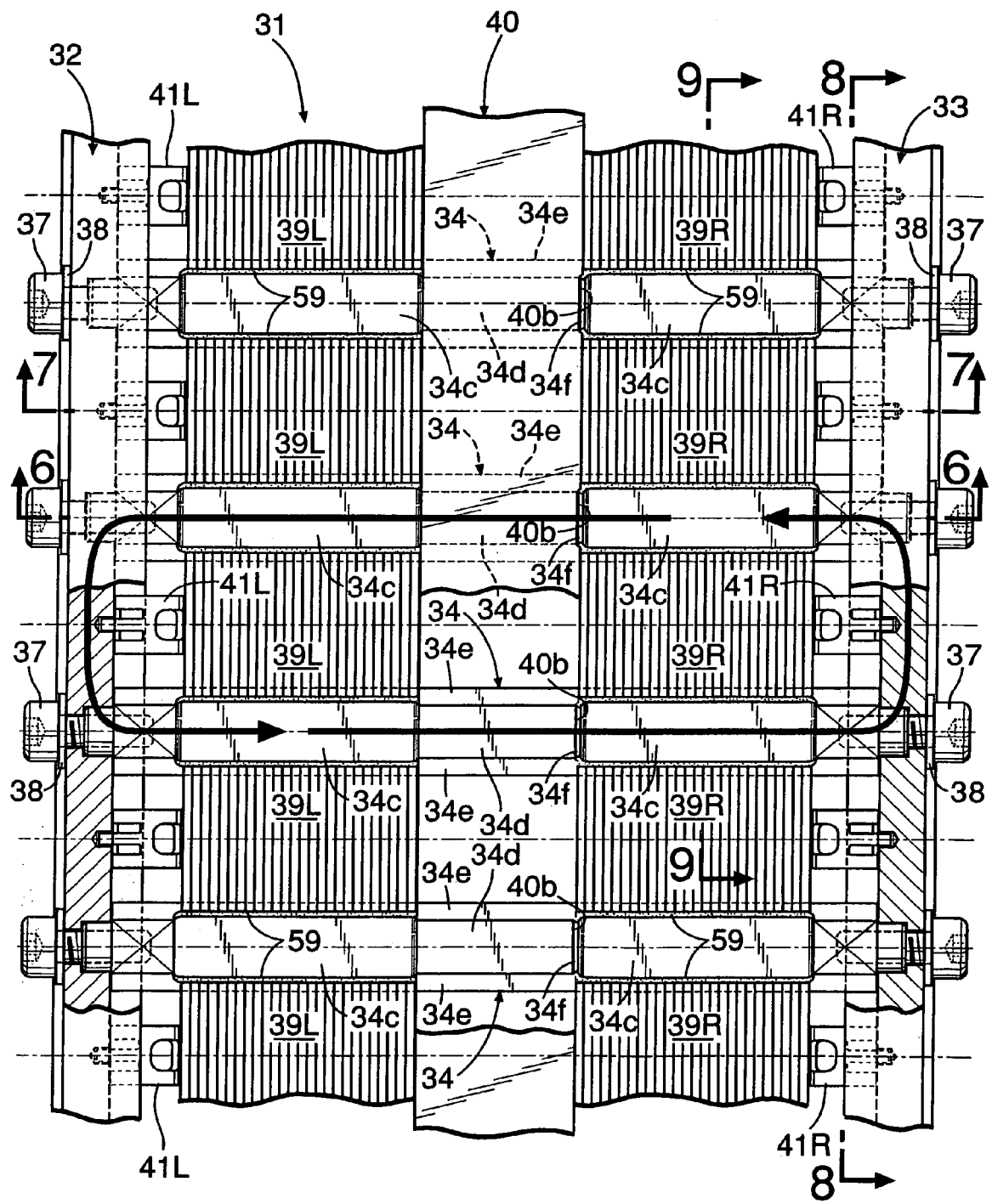
FIG. 5 is a view taken along the arrow direction of the line 5-5 in FIG. 3.

As illustrated in FIG. 5, 20 slits extending in parallel to the axis L are formed between the 20 connection members 34. A first induction magnetic pole 39L made of soft magnetic material, a ring 40 made of weak magnetic material and a second induction magnetic pole 39R made of soft magnetic material are inserted from the side of one end of the rotor body 31 in the direction of the axis L to each slit, and each slit is supported by them.

As illustrated in FIG. 12, the first and second induction magnetic poles 39L and 39R are comprised of a great number of steel plates stacked in the direction of the axis L. Concave portions 39a and 39a having quadrangular shapes in section are formed on the opposite sides along the axis L. Those concave portions 39a and 39a are engaged with the convex portions 34e and 34e of the connection members 34 and 34 positioned on the opposite side faces thereof to establish convexo-concave engagement. Thereby, the first and second induction magnetic poles 39L and 39R are prevented from dropping out in the radial direction. Occurrence of a slight clearance between the convex portions 34e and 34e and the concave portions 39a and 39a is not unavoidable. Therefore, in order to prevent the first and second induction magnetic poles 39L and 39R from relatively moving for the connection members 34 and generating noise, convexo-concave engagement portions thereof are fixed with adhesive 59 (see FIG. 9).

Here, in the embodiment, all of the concave portions 39a and 39a of the first and second induction magnetic poles 39L and 39R and the convex portions 34e and 34e of the connection members 34 have quadrangular shapes in section. If those components have semicircular shapes in section, noise can be reduced by the reduction of the clearance in the contact parts even without using the adhesive 59.

The first induction magnetic pole 39L, the ring 40 and the second induction magnetic pole 39R are assembled, for example, in the state where one end of the connection members 34 are connected to the first flange member 32. Thereafter, the second flange member 33 is connected to the other ends of the connection members 34.

Figure 14:
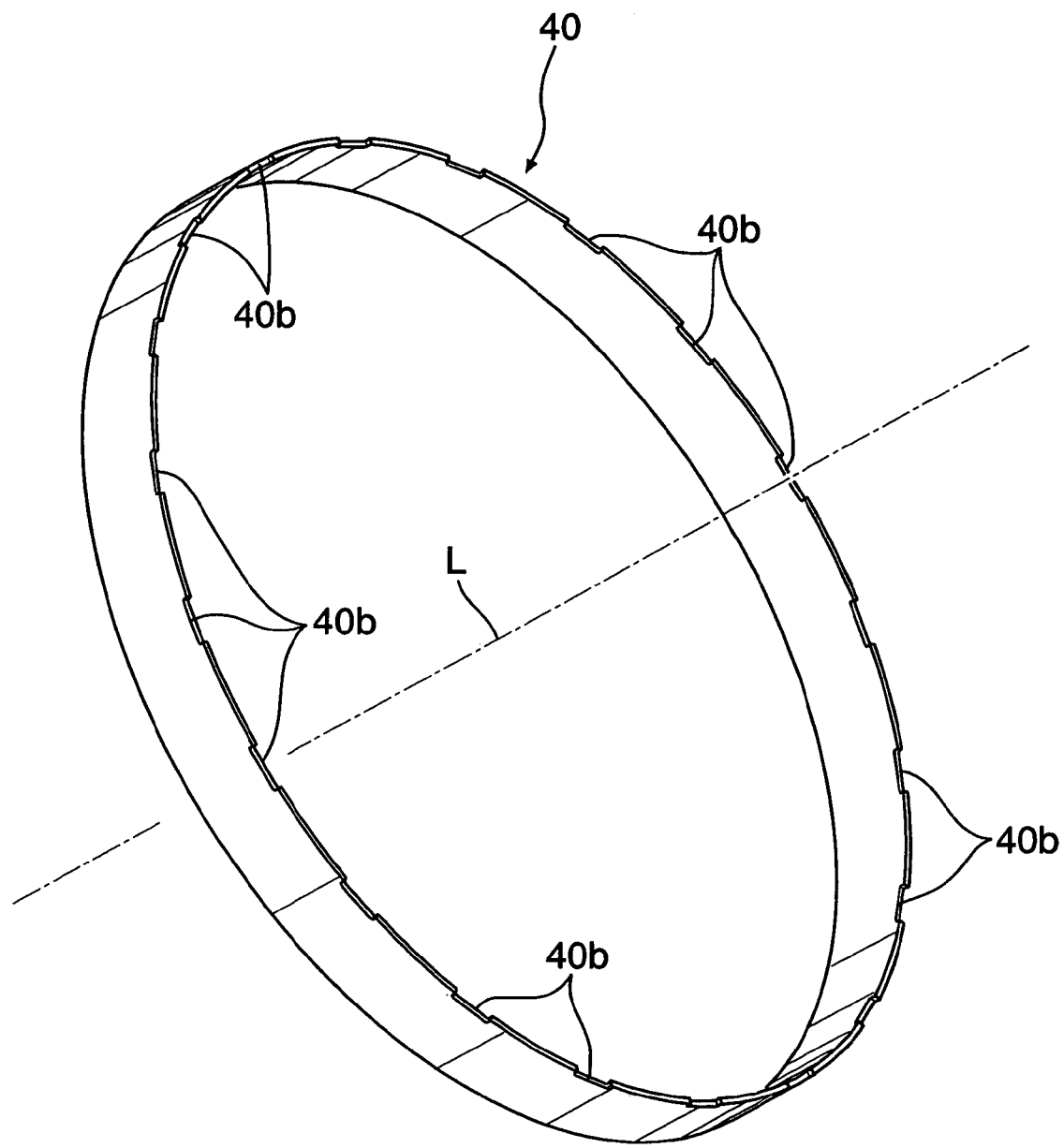
FIG. 14 is a perspective view of a ring.

As illustrated in FIG. 14, the ring 40 is made of a belt-shaped metal plate which is formed to have a toroidal shape. An end edge on the side of the second flange member 33 is provided with a plurality of positioning grooves 40b (20 grooves in the embodiment) in a concave state at equal distance of 18° therebetween.

As illustrated in FIG. 5 to FIG. 7, when the outer rotor 13 rotates, centrifugal force applied to the first and second induction magnetic poles 39L and 39R tries to deflect the connection members 34 to the outside in the radial direction. However, by pushing the center portions of the connection members 34 in the direction of the axis L with the ring 40 inwards in the radial direction, a deformation of the connection members 34 can be effectively suppressed to enable a rapid-rotation of the outer rotor 13.

In particular, the ring 40 is arranged between the first induction magnetic poles 39L and the second induction magnetic poles 39R, therefore, centrifugal force applied to the first and second induction magnetic poles 39L and 39R having heavy weight can be effectively supported. Moreover, the ring 40 supports the centrifugal force, thereby, the connection members 34 can be made thin and contribution to reduction in eddy current is attainable.

As illustrated in FIG. 5 and FIG. 7, the first and second induction magnetic poles 39L and 39R fitting to the slit between a pair of which are adjacent connection members 34 and 34 are biased with a pair of first and second springs 41L and 41R in the mutually approaching direction and are positioned in the direction of axis L in the following method.

All the respective 20 pieces of the first and second springs 41L and 41R have the same structure. Therefore, a structure of the second spring 41R being one of the springs will be described. The second spring 41R is made of a metal plate which is punched out in a predetermined shape and is curved and comprises a first latching portion 41a, a second latching portion 41b and a pressing portion 41c (see FIG. 13). A latching hole 33e is formed in the bottom portion of the toroidal groove 33b of the second flange member 33. The first latching portion 41a is engaged with that latching hole 33e and the second latching portion 41b is inserted into an outer peripheral wall of the toroidal groove 33b in a compressed state. Thereby, the second spring 41R is supported by the toroidal groove 33b of the second flange member 33. In that state, the pressing portion 41c of the second spring 41R is brought into contact to the end surface of the second induction magnetic pole 39R to generate elastic force F2 (see FIG. 7) leftwards in the direction of the axis L.

The first spring 41L is loaded to the toroidal groove 32b of the first flange member 32 in the above-described structure likewise the second spring 41R. In that state, the pressing portion 41c of the first spring 41L is brought into contact to the end surface of the first induction magnetic pole 39L to generate elastic force F1 (see FIG. 7) rightwards in the direction of the axis L. At that time, the first and second induction magnetic poles 39L and 39R sandwich the ring 40 and are pressed by the first and second springs 41L and 41R from the opposite ends. Therefore, in order to restrict the position thereof in the direction of the axis L, the following structure is adopted.

Specifically, in FIG. 7, the first induction magnetic pole 39L pushed rightwards by the elastic force F1 of the first spring 41L on the left side and the ring 40 brought into contact thereto are pushed rightwards. Each positioning groove 40b (see FIG. 14) formed at the right end of the ring 40 is brought into contact to the latching protrusion 34f of the connection member 34 from the left side and is positioned in the direction of the axis L. On the other hand, the second induction magnetic pole 39R pushed leftwards by the elastic force F2 of the second spring 41R on the right side is brought contact to the right end of the ring 40 from the right side and is positioned in the direction of the axis L. At that time, if the elastic force F2 of the second spring 41R on the right side is stronger than the elastic force F1 of the first spring 41L on the left side, the ring 40 and the first induction magnetic pole 39L will be pushed back to the left side by the elastic force F2 of the second spring 41R on the right side to give rise to possibility that the positioning groove 40b of the ring 40 is disengaged from the latching protrusion 34f of the connection member 34. Therefore, the elastic force F1 of the first spring 41L on the left side is set stronger than the elastic force F2 of the second spring 41R on the right side. The difference between the elastic forces F1 and F2 can be regulated by the difference of material of the first and second springs 41L and 41R and the difference in margin for compression.

As described above, the first and second induction magnetic poles 39L and 39R are arranged on the opposite sides of the ring 40 in the direction of the axis L. The first and second induction magnetic poles 39L and 39R are biased by the first and second springs 41L and 41R in the mutually approaching direction and are brought into pressure contact to the opposite side edges of the ring 40. Therefore, even if there is dispersion in dimensions of the induction magnetic poles 39L and 39R in the direction of the axis L, the dispersion thereof is absorbed so that the induction magnetic poles 39L and 39R can be reliably fixed.

In addition, the positioning groove 40b of the ring 40 is latched to the latching protrusion 34f of the connection member 34 and is positioned in the direction of the axis L. In that state, the first and second induction magnetic poles 39L and 39R are brought into pressure contact to the ring 40 and are fixed. Therefore, even if elastic force is applied by the first and second springs 41L and 41R from the opposite sides in the direction of the axis L, the first and second induction magnetic poles 39L and 39R can be precisely positioned in the direction of the axis L. Moreover, the positioning groove 40b of the ring 40 is latched to the latching protrusion 34f of the connection member 34. Thereby, a position of the ring 40 in the circumferential direction is attained at the same time.

As illustrated in FIG. 2, a first resolver 42 for detecting a rotational position of the outer rotor 13 is provided so as to surround the second outer rotor shaft 33a of the outer rotor 13. The first resolver 42 is comprised of a resolver rotor 43 fixed on the outer periphery of the second outer rotor shaft 33a and a resolver stator 44 fixed to the lid portion 17 of the casing 11 so as to surround the periphery of that resolver rotor 43.

As illustrated in FIG. 2 to FIG. 4 and FIG. 11, the inner rotor 14 includes: a cylindrically formed rotor body 45; an inner rotor shaft 47 fixed by a bolt 46 through a hub 45a of the rotor body 45; toroidal first and second rotor cores 48L and 48R comprised of a stacked steel plate and fit to the outer periphery of the rotor body 45; and a toroidal spacer 49 fit to the outer periphery of the rotor body 45. One end of the inner rotor shaft 47 is rotatably supported by a ball bearing 50 inside the second outer rotor shaft 33a on the axis L. In addition, the other end of the inner rotor shaft 47 is rotatably supported by a ball bearing 51 inside the first outer rotor shaft 32a and extends to the outside of the casing 11 as an output shaft of the inner rotor 14 through the first outer rotor shaft 32a and the lid portion 17 of the casing 11.

The first and second rotor cores 48L and 48R are fitted to the outer periphery of the rotor body 45 has the same structure and comprises a plurality of permanent magnet supporting holes 48a (20 pieces in the embodiment) (see FIG. 3 and FIG. 4) along its outer peripheral face. First and second permanent magnets 52L and 52R are pressed into the holes in the direction of the axis L. Polarity of the which are adjacent first permanent magnets 52L of the first rotor core 48L is alternately reversed and polarity of the which are adjacent second permanent magnets 52R of the second rotor core 48R is alternately reversed. The phase of the first permanent magnets 52L of the first rotor core 48L in the circumferential direction and the phase of the second permanent magnets 52L of the second rotor core 48R in the circumferential direction are mutually staggered only by a half portion of the pitches thereof (see FIG. 3 and FIG. 4).

The spacer 49 made of weak magnetic material is fitted to the center of the outer periphery of the rotor body 45 in the direction of the axis L. A pair of inner side permanent magnet supporting plates 53 and 53 for preventing the first and second permanent magnets 52L and 52R from dropping out is respectively fit to the outside thereof. The first and second rotor cores 48L and 48R are respectively fit to the outside thereof. A pair of outer side permanent magnet supporting plates 54 and 54 for preventing the first and second permanent magnets 52L and 52R from dropping out is respectively fit to the outside thereof. A pair of stopper rings 55 and 55 is respectively fixed to the outside thereof by pressure insertion.

As illustrated in FIG. 2, a second resolver 56 for detecting a rotational position of the inner rotor 14 is provided so as to surround the inner rotor shaft 47. The second resolver 56 is comprised of a resolver rotor 57 fixed on the outer periphery of the inner rotor shaft 47 and a resolver stator 58 fixed to the lid portion 17 of the casing 11 so as to surround the periphery of that resolver rotor 57.

Figure 3:
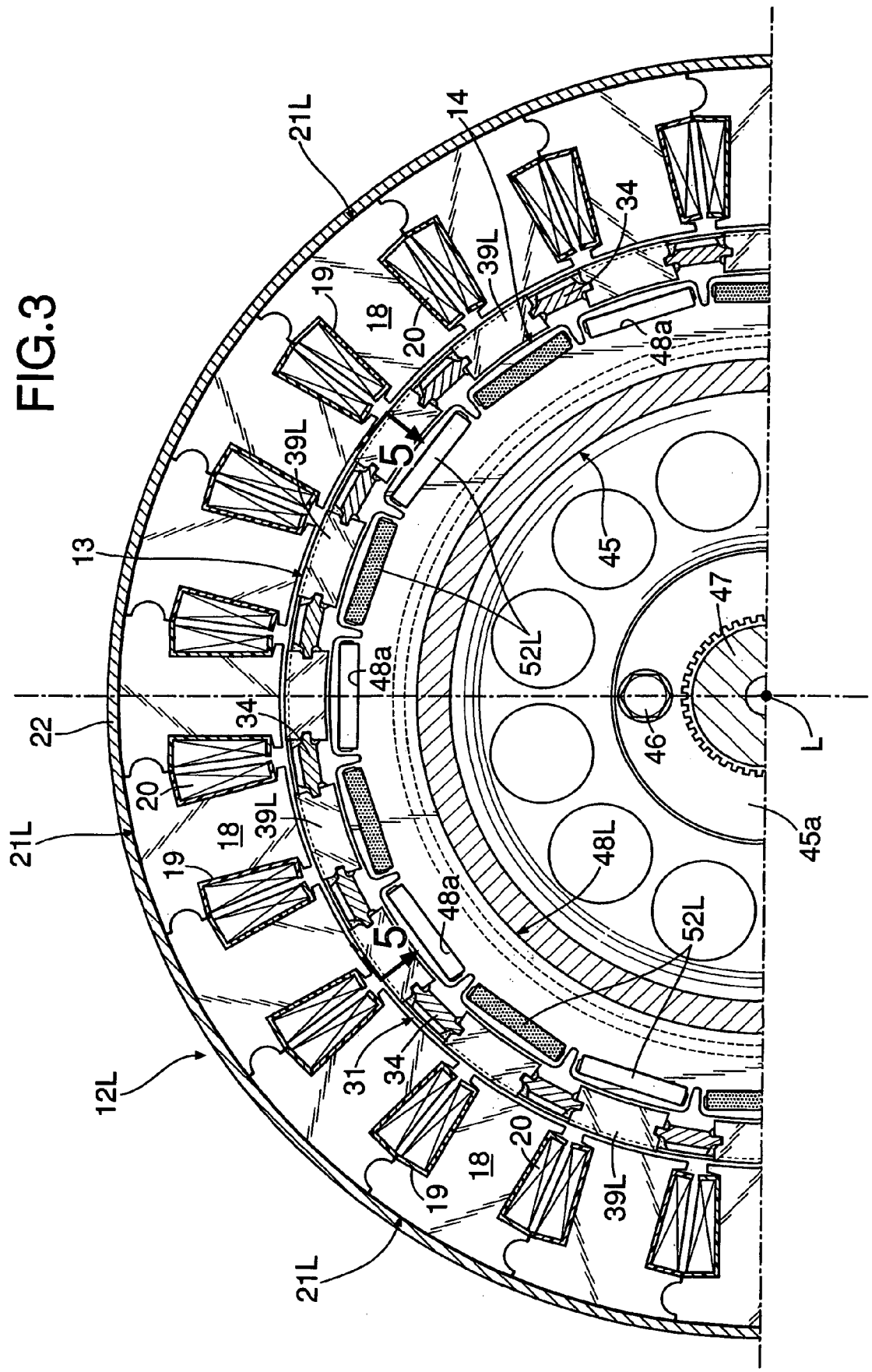
FIG. 3 is a sectional diagram taken along the line 3-3 in FIG. 2.
Figure 4:
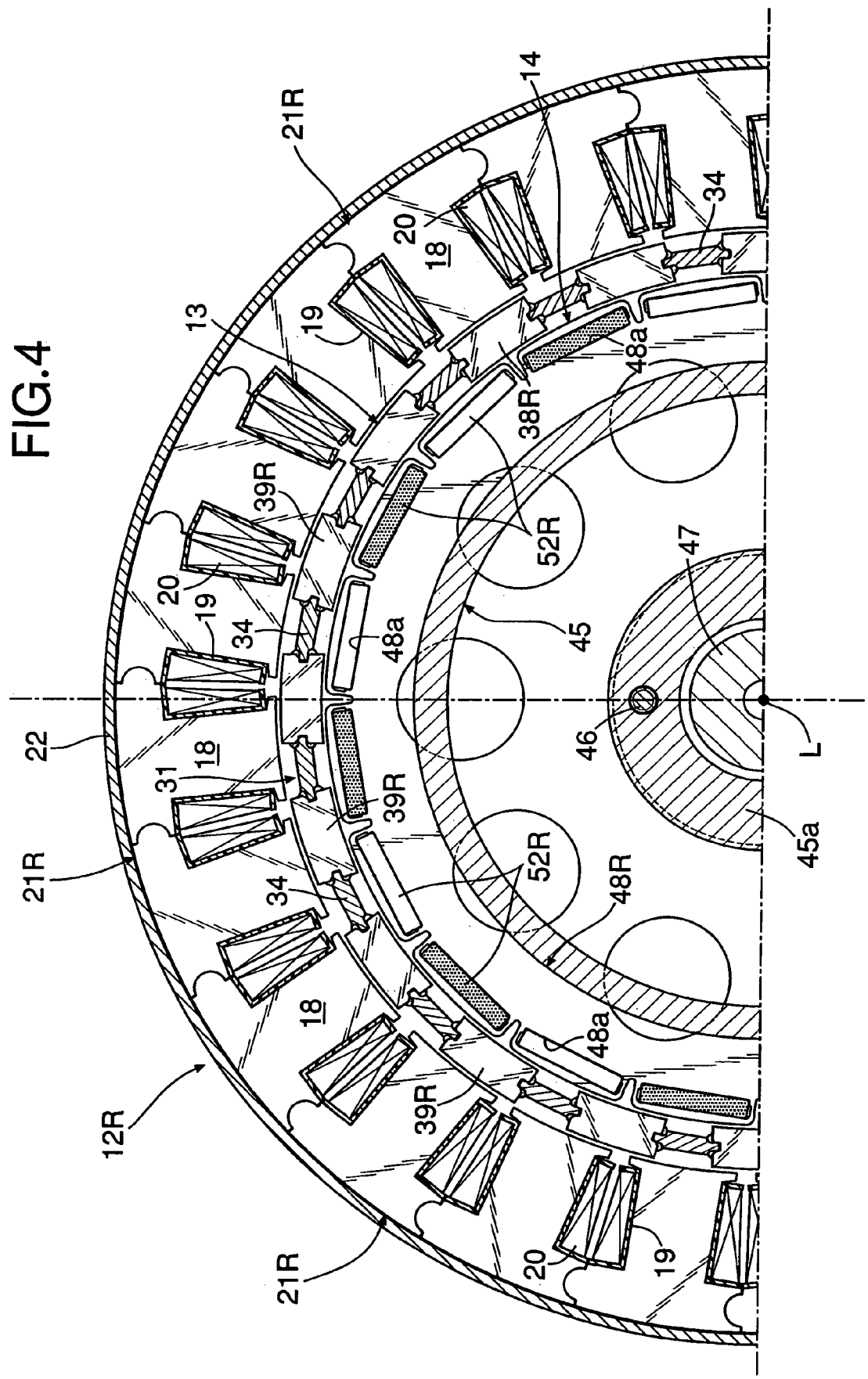
FIG. 4 is a sectional diagram taken along the line 4-4 in FIG. 2.

Thus, as illustrated in FIG. 3 and FIG. 4, the inner peripheral face of the first armature 21L of the first stator 12L faces the outer peripheral face of the first induction magnetic poles 39L exposed on the outer peripheral face of the outer rotor 13 through a slight air gap. The outer peripheral face of the first rotor core 48L of the inner rotor 14 faces the inner peripheral face of the first induction magnetic poles 39L exposed on the inner peripheral face of the outer rotor 13 through a slight air gap. Similarly, the inner peripheral face of the second armature 21R of the second stator 12R faces the outer peripheral face of the second induction magnetic poles 39R exposed on the outer peripheral face of the outer rotor 13 through a slight air gap. The outer peripheral face of the second rotor core 48R of the inner rotor 14 faces the inner peripheral face of the second induction magnetic poles 39R exposed on the inner peripheral face of the outer rotor 13 through a slight air gap.

Next, operating principle of an electric motor M of the first embodiment comprising such a configuration will be described.

Figure 15:
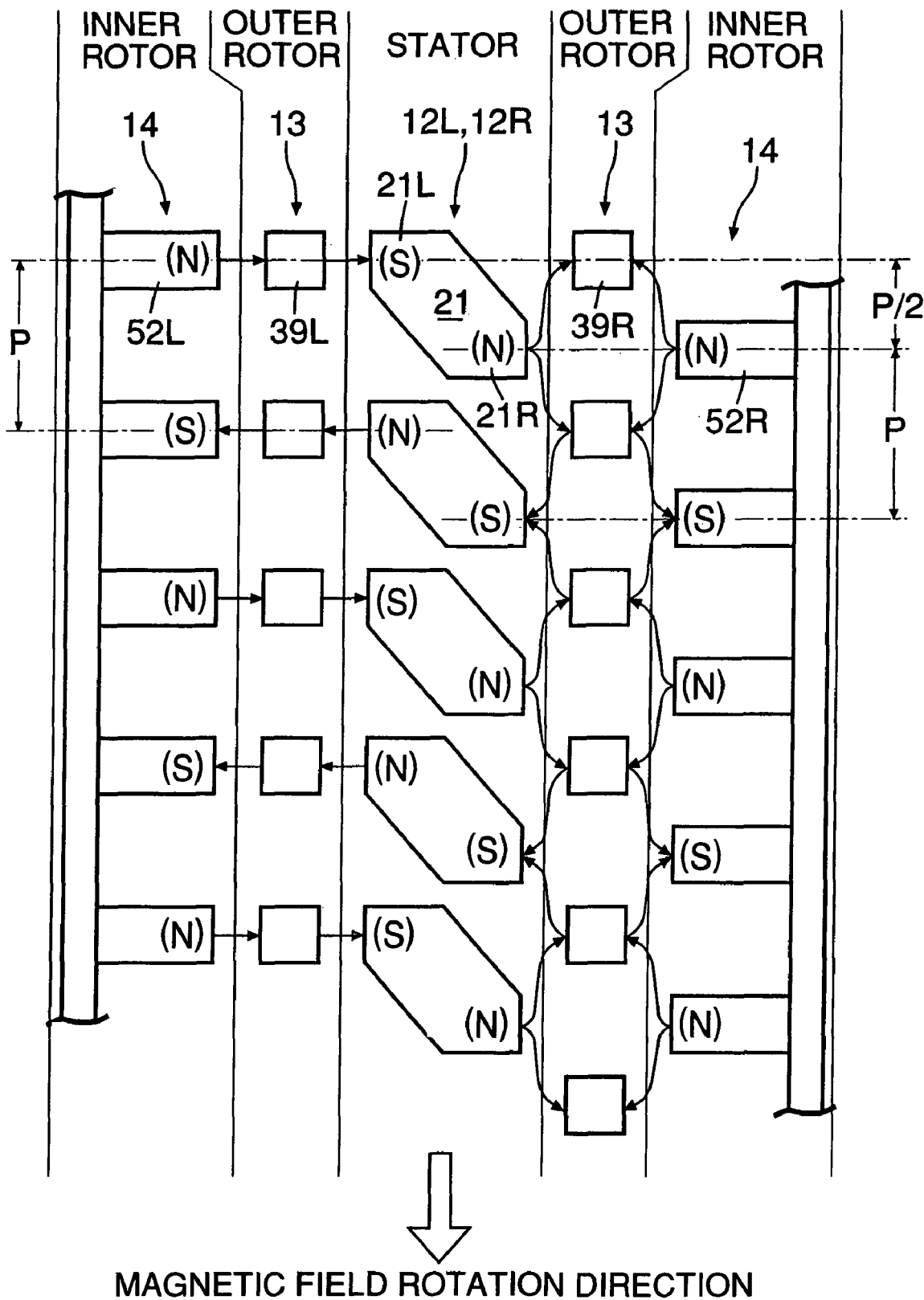
FIG. 15 is a schematic diagram of an electric motor deployed in the circumferential direction.

FIG. 15 schematically illustrates the state where the electric motor M is deployed in the circumferential direction. First and second permanent magnets 52L and 52R of the inner rotor 14 are respectively illustrated on the both sides of the left ant the right in FIG. 15. The north pole and the south pole of the first and second permanent magnets 52L and 52R are alternately arranged in a predetermined pitch P in the circumferential direction (in the vertical direction in FIG. 15). The first permanent magnets 52L and the second permanent magnets 52R are arranged with displacement of only a half of a predetermined pitch P, that is, a half pitch (P/2).

The virtual permanent magnets 21 corresponding to the first and second armatures 21L and 21R of the first and second stators 12L and 12R are arranged in the center in FIG. 15 in a predetermined pitch P in the circumferential direction. Actually, the respective number of the first and second armatures 21L and 21R of the first and second stators 12L and 12R is 24 pieces. The respective number of the first and second permanent magnets 52L and 52R of the inner rotor 14 is 20 pieces. Therefore, the pitch of the first and second armatures 21L and 21R do not match the pitch P of the first and second permanent magnets 52L and 52R of the inner rotor 14.

However, the first and second armatures 21L and 21R respectively form revolving magnetic fields. Therefore, the first and second armatures 21L and 21R can be replaced with 20 virtual permanent magnets 21 being arranged in the pitch P and rotating in the circumferential direction. The first and second armatures 21L and 21R will be hereinafter referred to as first and second virtual magnetic poles 21L and 21R of the virtual permanent magnets 21. Polarity of the first and second virtual magnetic poles 21L and 21R of the adjacent virtual permanent magnets 21 being present in the circumferential direction is alternately reversed. The first virtual magnetic poles 21L and the second virtual magnetic poles 21R of the respective virtual permanent magnets 21 are staggered only by a half pitch (P/2) in the circumferential direction.

The first and second induction magnetic poles 39L and 39R of the outer rotor 13 are arranged between the first and second permanent magnets 52L and 52R and the virtual permanent magnets 21. The first and second induction magnetic poles 39L and 39R are arranged in the pitch P in the circumferential direction and the first induction magnetic poles 39L and the second induction magnetic poles 39R are aligned in the direction of the axis L.

As illustrated in FIG. 15, when a polarity of the first virtual magnetic pole 21L of the virtual permanent magnet 21 is different from a polarity of the facing (the closest) first permanent magnet 52L, a polarity of the second virtual magnetic pole 21R of the virtual permanent magnet 21 will be the same as a polarity of the facing (the closest) second permanent magnet 52R. In addition, when a polarity of the second virtual magnetic pole 21R of the virtual permanent magnet 21 is different from a polarity of the facing (the closest) second permanent magnet 52R, a polarity of the first virtual magnetic pole 21L of the virtual permanent magnet 21 will be the same as a polarity of the facing (the closest) first permanent magnet 52L (see FIG. 17G).

At first, an operation in the case where a revolving magnetic field is generated in the first and second stators 12L and 12R (first and second virtual magnetic poles 21L and 21R) to, thereby, drive the outer rotor 13 (first and second induction magnetic poles 39L and 39R) to rotate in the state where the inner rotor 14 (first and second permanent magnets 52L and 52R) is unrotatably fixed will be described. In that case, the virtual permanent magnets 21 rotate downwards in the drawing for the fixed first and second permanent magnets 52L and 52R in an order of FIG. 16A, FIG. 16B, FIG. 16C, FIG. 16D, FIG. 17E, FIG. 17F and FIG. 17G. Thereby, the first and second induction magnetic poles 39L and 39R rotate downwards in the drawing.

Figure 16A:
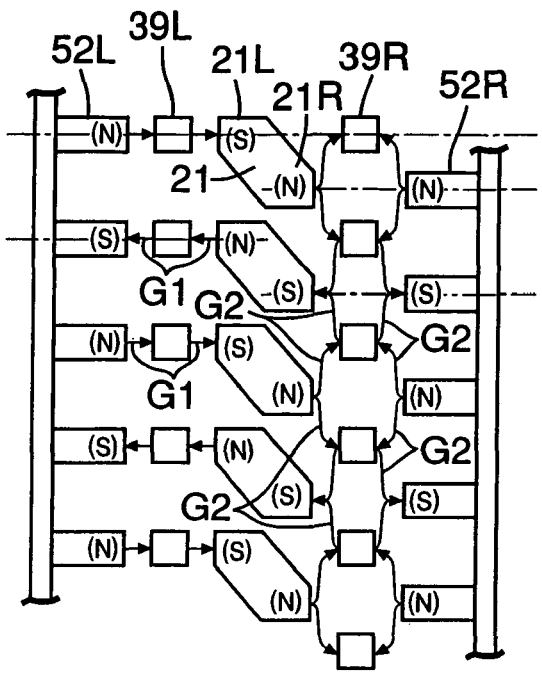
FIG. 16 is an operation explanatory diagram in the case of fixing an inner rotor (part 1).

As illustrated in FIG. 16A, the first induction magnetic poles 39L are aligned for the first virtual magnetic poles 21L of the virtual permanent magnets 21 and the first permanent magnets 52L that face each other. The second induction magnetic poles 39R causes the virtual permanent magnets 21 to rotate downwards in the drawing from the state of being staggered by a half pitch (P/2) for the second virtual magnetic poles 21R and the second permanent magnets 52R that face each other. At the start of that rotation, a polarity of the first virtual magnetic poles 21L of the virtual permanent magnets 21 is different from a polarity of the facing first permanent magnets 52L. A polarity of the second virtual magnetic poles 21R of the virtual permanent magnets 21 is the same as a polarity of the facing second permanent magnets 52R.

The first induction magnetic poles 39L are arranged between the first virtual magnetic poles 21L of the virtual permanent magnets 21 and the first permanent magnets 52L. Therefore, the first induction magnetic poles 39L are magnetized by the first permanent magnets 52L and the first virtual magnetic poles 21L. Thereby, first magnetic field lines G1 are generated between the first permanent magnets 52L, first induction magnetic poles 39L and the first virtual magnetic poles 21L. Similarly, the second induction magnetic poles 39R are arranged between the second virtual magnetic poles 21R and the second permanent magnets 52R. Therefore, the second induction magnetic poles 39R are magnetized by the second virtual magnetic poles 21R and the second permanent magnets 52R. Thereby, second magnetic field lines G2 are generated between the second virtual magnetic poles 21R, the second induction magnetic poles 39R and the second permanent magnets 52R.

Figure 18A:
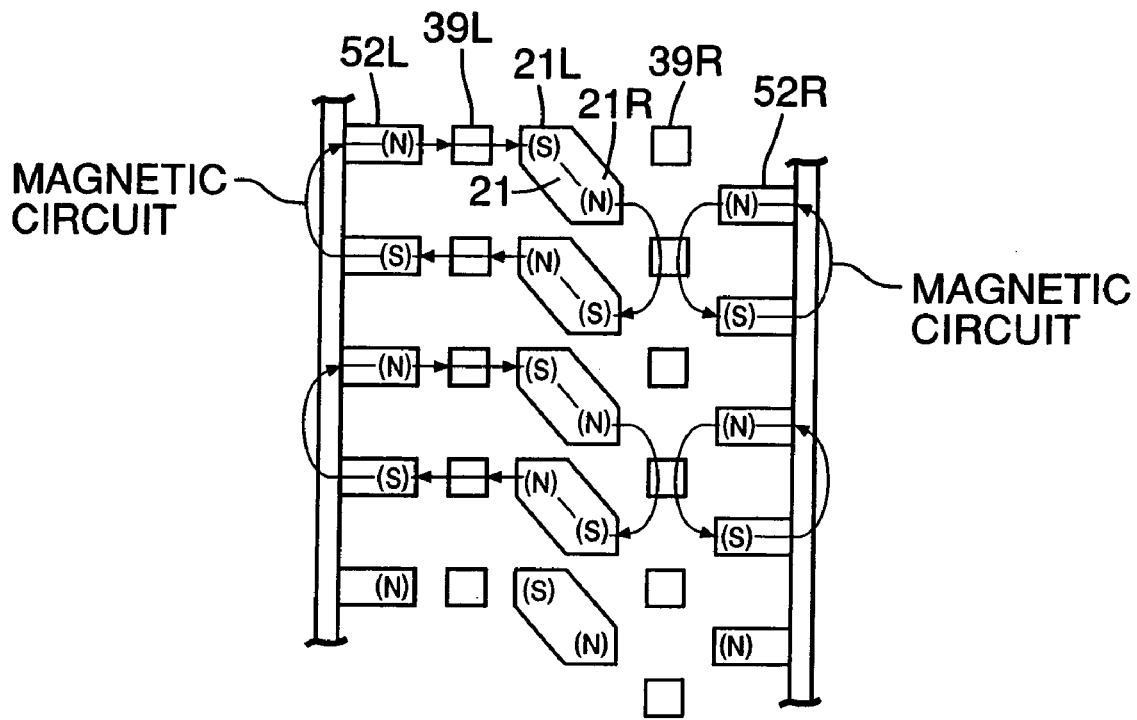
FIG. 18 is an operation explanatory diagram in the case of fixing an inner rotor (part 3).

In the state illustrated in FIG. 16A, the first magnetic field lines G1 are generated so as to bring the first permanent magnets 52L, the first induction magnetic poles 39L and the first virtual magnetic poles 21L into connection. The second magnetic field lines G2 are generated so as to bring the two second virtual magnetic poles 21R which are adjacently present in the circumferential direction and the second induction magnetic poles 39R being positioned between the opposite parties into connection and so as to bring the two second permanent magnets 52R which are adjacently present in the circumferential direction and the second induction magnetic poles 39R being positioned between the opposite parties into connection. Consequently, in such a state, a magnetic circuit as illustrated in FIG. 18A is configured. In such a state, since the first magnetic field lines G1 have linear shapes, no magnetic force to cause rotation in the circumferential direction acts on the first induction magnetic poles 39L. In addition, the level of bending and the total flux content of the two second magnetic field lines G2 between each pair of the second virtual magnetic poles 21R and the second induction magnetic poles 39R which are respectively adjacently present in the circumferential direction are mutually equal and, similarly, the level of bending and the total flux content of the two second magnetic field lines G2 between each pair of the second permanent magnets 52R and the second induction magnetic poles 39R which are respectively adjacently present in the circumferential direction are also mutually equal and balancing is established. Therefore, no magnetic force to cause rotation in the circumferential direction acts on the second induction magnetic poles 39L as well.

Figure 16B:
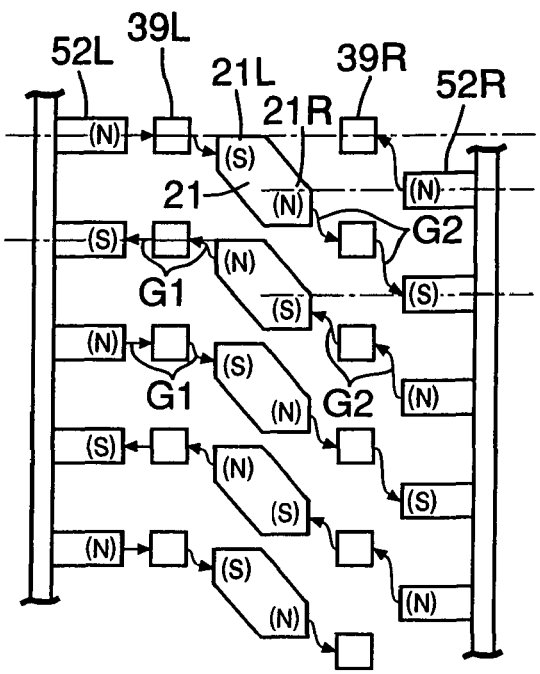
Figure 16C:
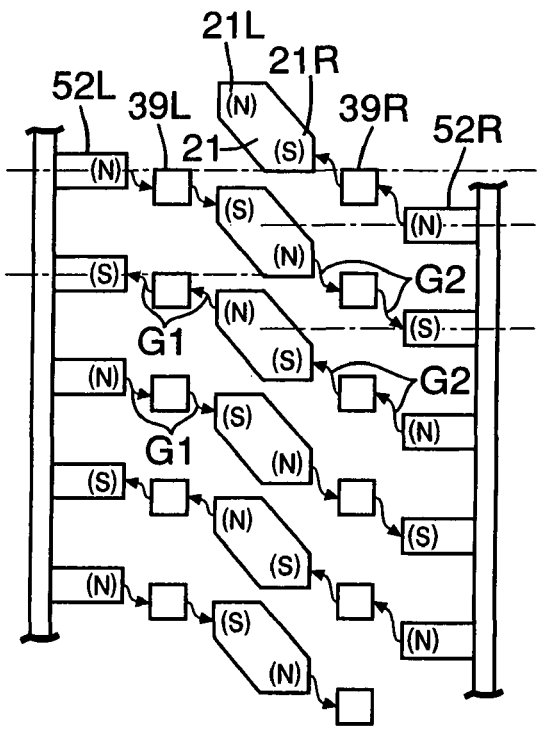
Figure 16D:
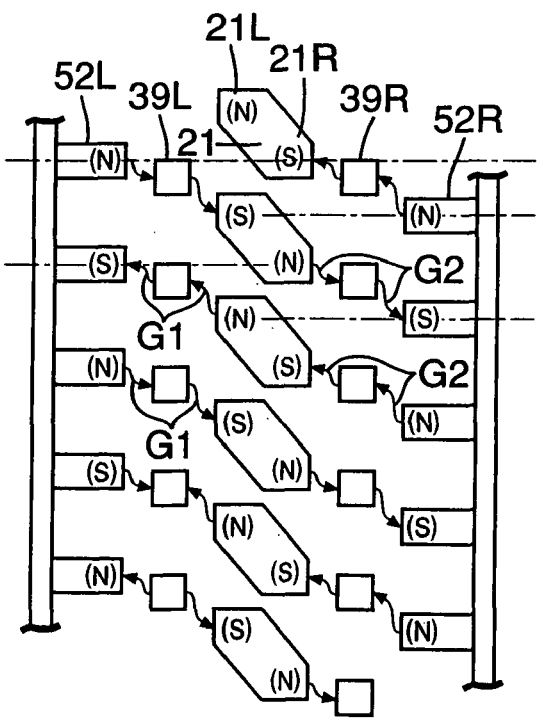
Figure 18B:
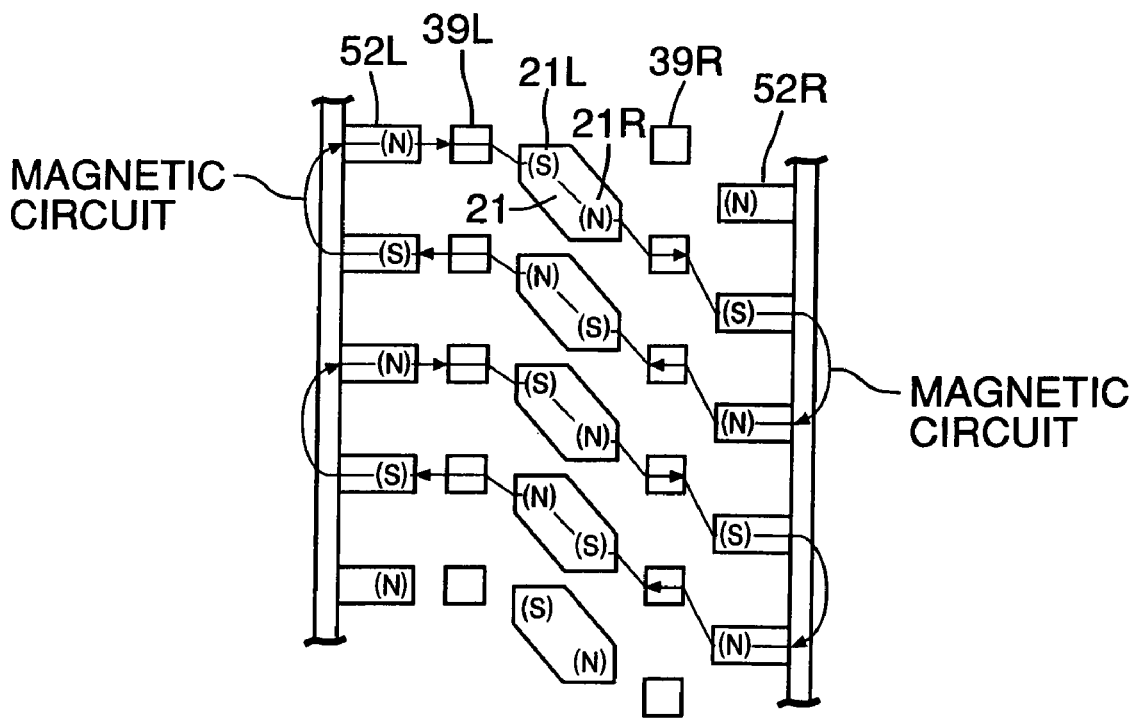

In addition, when the virtual permanent magnets 21 rotate from the position illustrated in FIG. 16A to the position illustrated in FIG. 16B, the second magnetic field lines G2 so as to bring the second virtual magnetic poles 21R, the second induction magnetic poles 39R and the second permanent magnets 52R into connection are generated and the first magnetic field lines G1 between the first induction magnetic poles 39L and the first virtual magnetic poles 21L will be established in the bent state. Accompanied thereby, the first and second magnetic field lines G1 and G2 configure a magnetic circuit as illustrated in FIG. 18B.

In that sate, although the level of bending of the first magnetic field lines G1 is small, its total flux content is abundant. Therefore, comparatively strong magnetic force acts on the first induction magnetic poles 39L. Thereby, the first induction magnetic poles 39L are driven by comparatively large drive force in the rotating direction of the virtual permanent magnets 21, that is, in the magnetic field rotation direction. Consequently, the outer rotor 13 rotates in the magnetic field rotation direction. In addition, although the level of bending of the second magnetic field lines G2 is significant, its total flux content is not abundant. Therefore, comparatively weak magnetic force acts on the second induction magnetic poles 39R. Thereby, the second induction magnetic poles 39R are driven by comparatively small drive force in the magnetic field rotation direction. Consequently, the outer rotor 13 rotates in the magnetic field rotation direction.

Subsequently, the virtual permanent magnet 21 rotates from the position illustrated in FIG. 16B to the positions illustrated in FIGS. 16C and 16D and FIGS. 17E and 17F in this order. Then, the first induction magnetic poles 39L and the second induction magnetic poles 39R are respectively driven in the magnetic field rotation direction by the magnetic force due to the first and second magnetic field lines G1 and G2. Consequently, the outer rotor 13 rotates in the magnetic field rotation direction. During that time, although the level of bending of the first magnetic field lines G1 get larger, its total flux content gets small. Thereby, the magnetic force applied to the first induction magnetic poles 39L gradually gets weaker. Consequently, the drive force for driving the first induction magnetic poles 39L in the magnetic field rotation direction gradually gets smaller. In addition, although the level of bending of the second magnetic field lines G2 get smaller, its total flux content gets larger. Thereby, the magnetic force applied to the second induction magnetic poles 39R gradually gets stronger. Consequently, the drive force for driving the second induction magnetic poles 39R in the magnetic field rotation direction gradually gets larger.

Figure 17E:
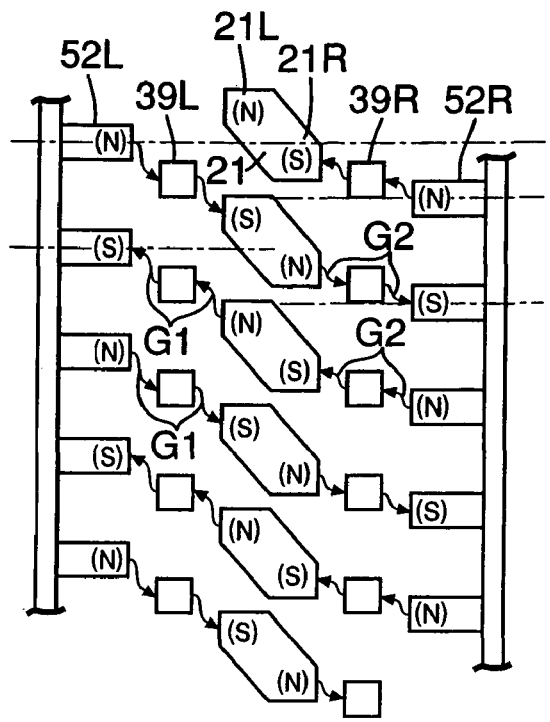
FIG. 17 is an operation explanatory diagram in the case of fixing an inner rotor (part 2).
Figure 17F:
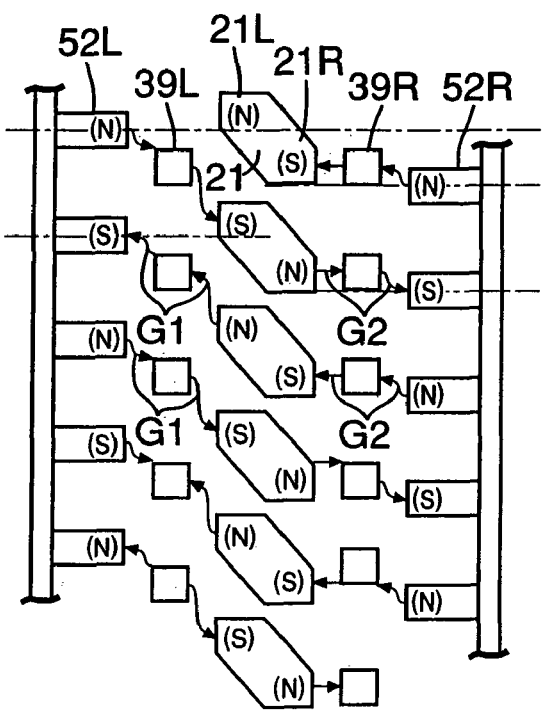
Figure 17G:
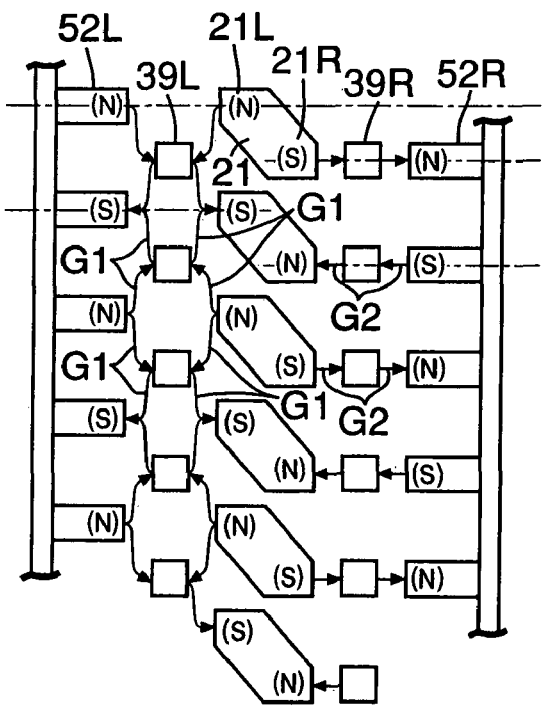

And, while virtual permanent magnet 21 rotates from the position illustrated in FIG. 17E to the position illustrated in FIG. 17F, the second magnetic field lines G2 enters a bent state and its total flux content gets closer to the most abundant state. Consequently, the strongest magnetic force is applied to the second induction magnetic poles 39R so as to maximize the drive force applied to the second induction magnetic poles 39R. Thereafter, as illustrated in FIG. 17G, the virtual permanent magnet 21 rotates for the portion of the pitch P from the original position in FIG. 16A. Thereby, the first and second virtual magnetic poles 21L and 21R of the virtual permanent magnet 21 respectively rotate to the positions facing the first and second permanent magnets 52L and 52R and, then, enter a state where right and left are reversed from the state in FIG. 16A. Only for that moment, the magnetic force causing the outer rotor 13 to rotate in the circumferential direction does not act.

When the virtual permanent magnet 21 rotates further from that state, the magnetic force due to the first and second magnetic field lines G1 and G2 drives the first and second induction magnetic poles 39L and 39R in the magnetic field rotation direction so that the outer rotor 13 rotates in the magnetic field rotation direction. On the contrary, during that time, while the virtual permanent magnet 21 rotates again up to the position illustrated in FIG. 16A, the magnetic force applied to the first induction magnetic poles 39L gets stronger since the total flux content of the first magnetic field lines G1 gets abundant although the level of bending of the first magnetic field lines G1 gets smaller. Consequently, the drive force acting on the first induction magnetic poles 39L gets larger. On the contrary, the magnetic force applied to the second induction magnetic poles 39R gets weaker since the total flux content of the second magnetic field lines G2 gets smaller although the level of bending of the second magnetic field lines G2 gets larger. Consequently, the drive force acting on the second induction magnetic poles 39R gets smaller.

In addition, as apparent from comparison between FIG. 16A and FIG. 17G, the first and second induction magnetic poles 39L and 39R rotate only for the half of the pitch (P/2) as the virtual permanent magnet 21 rotates for the portion of the pitch P. Therefore, the outer rotor 13 rotates at a half speed of the rotating speed of the rotating magnetic fields of the first and second stators 12L and 12R. The reason thereof is that the operation of the magnetic force due to the first and second magnetic field lines G1 and G2 causes the first and second induction magnetic poles 39L and 39R to rotate, retaining the respective states of being positioned in the middle of the first permanent magnets 52L and the first virtual magnetic poles 21L connected by the first magnetic field lines G1 and in the middle of the second permanent magnets 52R and the second virtual magnetic poles 21R connected by the second magnetic field lines G2.

Next, in the state where the outer rotor 13 is fixed, an operation of the electric motor M causing the inner rotor 14 to rotate will be described with reference to FIG. 19 and FIG. 20.

Figure 19A:
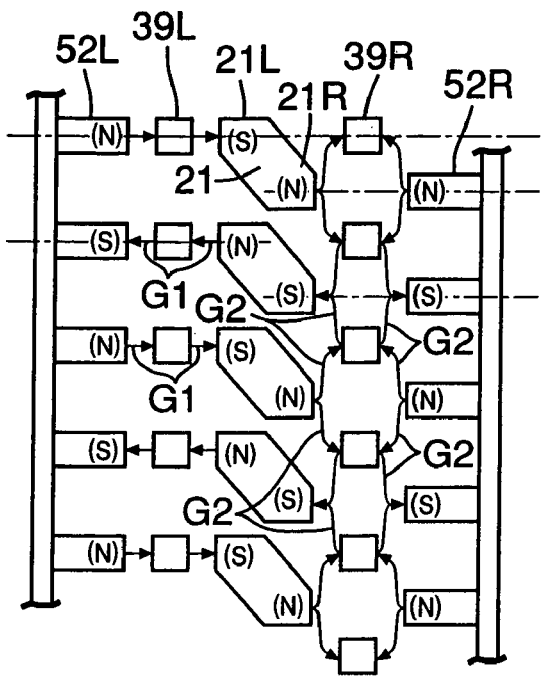
FIG. 19 is an operation explanatory diagram in the case of fixing an outer rotor (part 1).

Firstly, as illustrated in FIG. 19A, the first and second rotating magnetic fields are caused to rotate downwards in the drawing from the state where the respective second induction magnetic poles 39R are positioned between the respective which are adjacent second permanent magnets 52R as well as the respective first induction magnetic poles 39L face the respective first permanent magnets 52L. At the start of that rotation, a polarity of the respective first virtual magnetic poles 21L is different from a polarity of the facing respective first permanent magnets 52L. A polarity of the respective second virtual magnetic poles 21R is the same as a polarity of the facing respective second permanent magnets 52R.

Figure 19B:
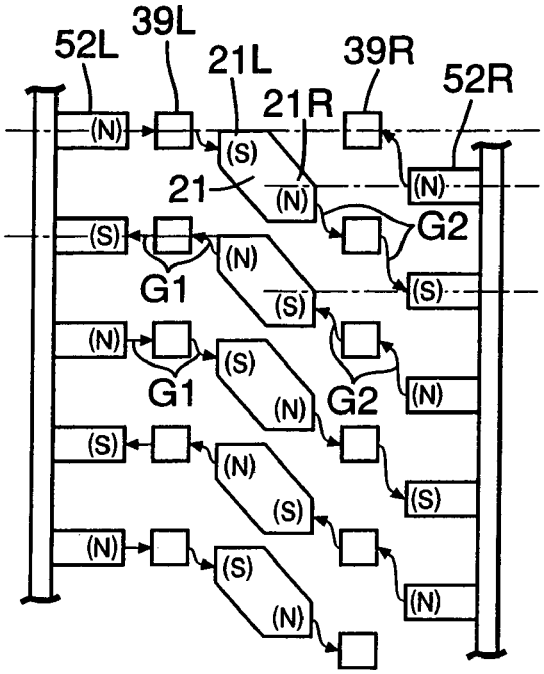

When the virtual permanent magnets 21 rotate to the position illustrated in FIG. 19B from that state, the first magnetic field lines G1 between the first induction magnetic poles 39L and the first virtual magnetic poles 21L will enter a bent state. In addition to this, by the second virtual magnetic poles 21R getting closer to the second induction magnetic poles 39R, the second magnetic field lines G2 so as to bring the second virtual magnetic poles 21R, the second induction magnetic poles 39R and the second permanent magnets 52R into connection are generated. Consequently, a magnetic circuit as illustrated in FIG. 18B is configured in the first and second permanent magnets 52L and 52R, the virtual permanent magnets 21 and the first and second induction magnetic poles 39L and 39R.

In that state, no magnetic force so as to cause the first permanent magnets 52L to rotate for the first induction magnetic poles 39L is generated since the first magnetic field lines G1 between the first permanent magnets 52L and the first induction magnetic poles 39L are straight although the total flux content of the first magnetic field lines G1 is intensive. In addition, distance between the second permanent magnets 52R and the second virtual magnetic poles 21R with polarity different therefrom is comparatively long. Thereby, a magnetic force acts on the second permanent magnets 52R so as to cause the second permanent magnets 52R to get closer to the second induction magnetic poles 39R since the level of bending of the second magnetic field lines G2 between the second induction magnetic poles 39R and the second permanent magnets 52R is large although the total flux content thereof is comparatively small. Thereby, the second permanent magnets 52R together with the first permanent magnets 52L are driven to rotating direction of the virtual permanent magnets 21, that is, the direction (upwards in FIG. 16) opposite from the magnetic field rotation direction and rotate towards the position illustrated in FIG. 19C. In addition, accompanied thereby, the inner rotor 14 rotates in the direction opposite to the magnetic field rotation direction.

Figure 19C:
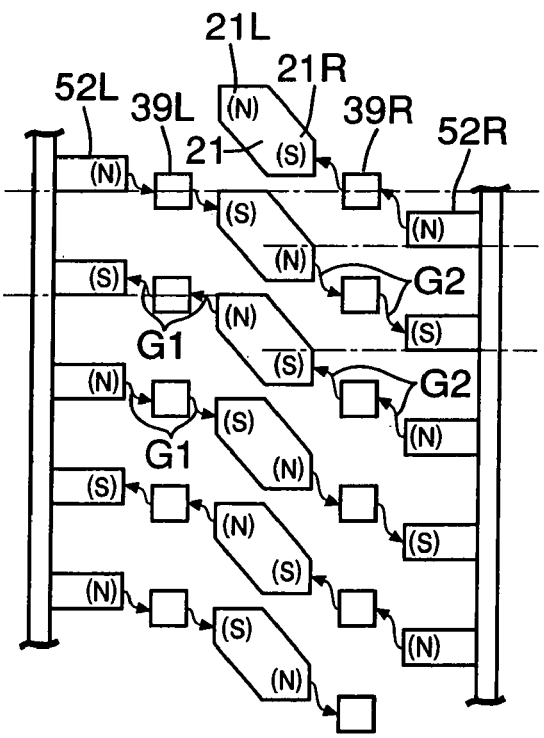
Figure 19D:
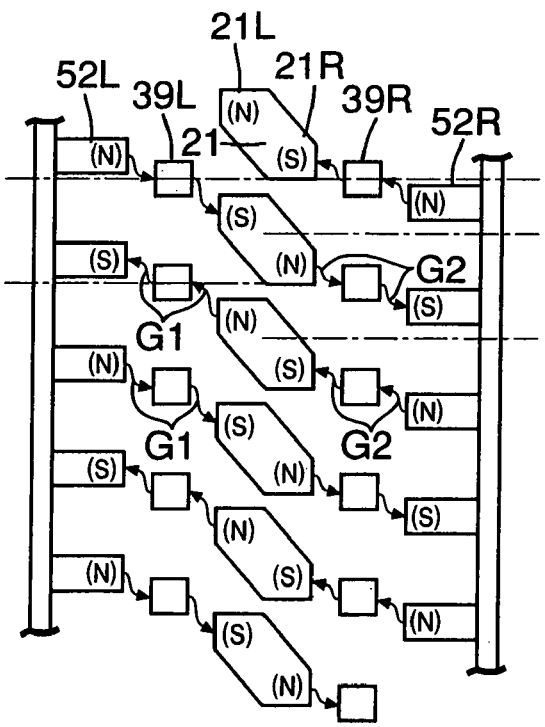

While the first and second permanent magnets 52L and 52R rotate from the position illustrated in FIG. 19B to the position illustrated in FIG. 19C, the virtual permanent magnets 21 rotate towards the position illustrated in FIG. 19D. As described above, the second permanent magnets 52R get closer to the second induction magnetic poles 39R. Thereby, although the level of bending of the second magnetic field lines G2 between the second induction magnetic poles 39R and the second permanent magnets 52R gets smaller, the total flux content of the second magnetic field lines G2 gets abundant as the virtual permanent magnets 21 get further closer to the second induction magnetic poles 39R. Consequently, also in that case, a magnetic force acts on the second permanent magnets 52R so as to cause the second permanent magnets 52R to get closer to the second induction magnetic poles 39R. Thereby, the second permanent magnets 52R together with the first permanent magnets 52L are driven to the direction opposite to the magnetic field rotation direction.

In addition, as the first permanent magnets 52L rotate in the direction opposite to the magnetic field rotation direction, the first magnetic field lines G1 between the first permanent magnets 52L and the first induction magnetic poles 39L bends. Thereby a magnetic force acts on the first permanent magnets 52L so as to cause the first permanent magnets 52L to get closer to the first induction magnetic poles 39L. However, in that state, the magnetic force due to the first magnetic field lines G1 is weaker than the above-described magnetic force due to the second magnetic field lines G2 since the level of bending of the first magnetic field lines G1 is smaller than the level of bending of the second magnetic field lines G2. Consequently, the magnetic force equivalent to the difference of both the magnetic forces drive the second permanent magnets 52R together with the first permanent magnets 52L in the direction opposite to the magnetic field rotation direction.

As illustrated in FIG. 19D, when the distance between the first permanent magnets 52L and the first induction magnetic poles 39L and the distance between the second induction magnetic pole 39R and the second permanent magnets 52R are substantially equal each other, the total flux content and the level of bending of the first magnetic field lines G1 between the first permanent magnets 52L and the first induction magnetic poles 39L are substantially equal to the total flux content and the level of bending of the second magnetic field lines G2 between the second induction magnetic poles 39R and the second permanent magnets 52R respectively.

Consequently, the magnetic force due to those first and second magnetic field lines G1 and G2 are mutually and substantially balanced to cause the state where the first and second permanent magnets 52L and 52R are temporarily not driven.

Figure 20E:
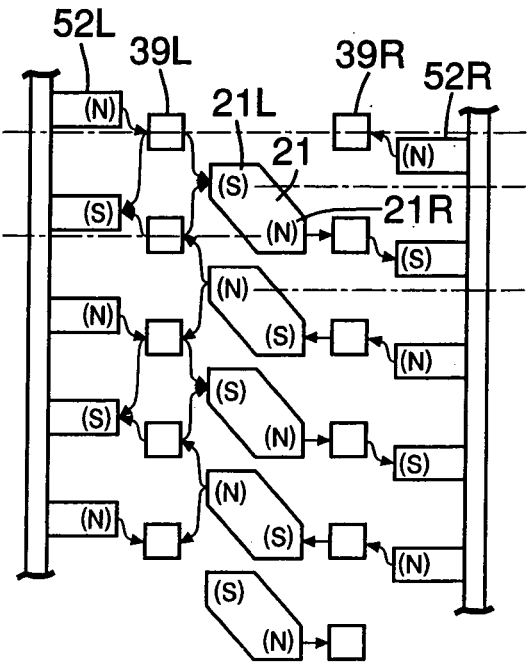
FIG. 20 is an operation explanatory diagram in the case of fixing an outer rotor (part 2).
Figure 20F:
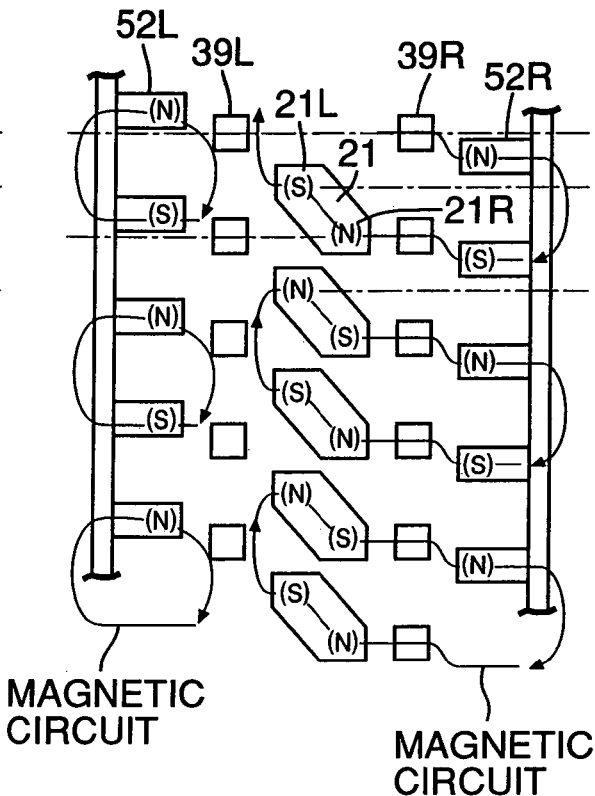

When the virtual permanent magnets 21 rotate from that state to the position illustrated in FIG. 20E, the generation state of the first magnetic field lines G1 changes to configure a magnetic circuit as illustrated in FIG. 20F. Thereby, the magnetic force due to the first magnetic field lines G1 will hardly act on the first permanent magnets 52L so as to cause the first permanent magnets 52L to get closer to the first induction magnetic poles 39L. Therefore, the magnetic force due to the second magnetic field lines G2 drives the second permanent magnets 52R together with the first permanent magnets 52L to the position illustrated in FIG. 20G in the direction opposite to the magnetic field rotation direction.

Figure 20G:
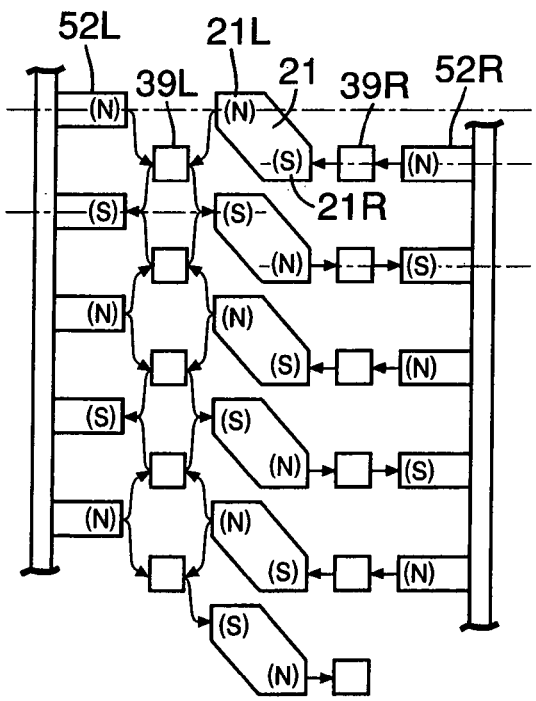

On the contrary, when the virtual permanent magnets 21 slightly rotate from the position illustrated in FIG. 20G, the magnetic force due to the first magnetic field lines G1 between the first permanent magnets 52L and the first induction magnetic poles 39L acts on the first permanent magnets 52L so as to cause the first permanent magnets 52L to get closer to the first induction magnetic poles 39L. Thereby, the first permanent magnets 52L together with the second permanent magnets 52R are driven in the direction opposite to the magnetic field rotation direction and the inner rotor 14 rotates in the direction opposite to the magnetic field rotation direction. When the virtual permanent magnets 21 further rotate, magnetic force equivalent to the difference between the magnetic force due to the first magnetic field lines G1 between the first permanent magnets 52L and the first induction magnetic poles 39L and the magnetic force due to the second magnetic field lines G2 between the second induction magnetic poles 39R and the second permanent magnets 52R drives the first permanent magnets 52L together with the second permanent magnets 52R in the direction opposite to the magnetic field rotation direction. Thereafter, when the magnetic force due to the second magnetic field lines G2 hardly acts on the second permanent magnets 52R to cause the second permanent magnets 52R to get closer to the second induction magnetic poles 39R, the magnetic force due to the first magnetic field lines G1 drives the first permanent magnets 52L together with the second permanent magnets 52R.

As described above, as the first and second rotating magnetic fields rotate, the magnetic force due to the first magnetic field lines G1 between the first permanent magnets 52L and the first induction magnetic poles 39L and the magnetic force due to the second magnetic field lines G2 between the second induction magnetic poles 39R and the second permanent magnets 52R and equivalent to the difference between those magnetic forces alternately act on the first and second permanent magnets 52L and 52R, that is, the inner rotor 14. Thereby, the inner rotor 14 rotates in the direction opposite to the magnetic field rotation direction. In addition, the magnetic force, that is, the driving force, alternately acts on the inner rotor 14, thus, the torque of the inner rotor 14 will substantially become constant.

In that case, the inner rotor 14 reversely rotates at the same speed as the first and second rotating magnetic fields. The reason thereof is that the operation of the magnetic force due to the first and second magnetic field lines G1 and G2 causes the first and second permanent magnets 52L and 52R to rotate, retaining the respective states of the first and second induction poles 39L and 39R being positioned in the middle of the first permanent magnets 52L and the first virtual magnetic poles 21L and in the middle of the second permanent magnets 52R and the second virtual magnetic poles 21R.

So far, the case where the inner rotor 14 is fixed to cause the outer rotor 13 to rotate in the magnetic field rotation direction and the case where the outer rotor 13 is fixed to cause the inner rotor 14 to rotate in the direction opposite to the magnetic field rotation direction were described separately. However, of course, both the inner rotor 14 and the outer rotor 13 can be caused to rotate mutually in opposite directions.

Thus, in the case of causing either the inner rotor 14 or the outer rotor 13 or otherwise both the inner rotor 14 and the outer rotor 13 to rotate, the state of magnetization of the first and second induction magnetic poles 39L and 39R changes according to the relative rotating position of the inner rotor 14 and the outer rotor 13 to enable rotation without giving rise to slipping so that functioning as a synchronous machine enables to enhance efficiency. In addition, the number of the first virtual magnetic poles 21L, the first permanent magnets 52L and the first induction magnetic poles 39L is mutually set to the same and the number of the second virtual magnetic poles 21R, the second permanent magnets 52R and the second induction magnetic poles 39R is mutually set to the same. Therefore, in the case of driving either the inner rotor 14 or the outer rotor 13, the torque of the electric motor M can be obtained sufficiently.

Thus, according to the electric motor M of the present embodiment, an outer hull of the outer rotor 13 is comprised of the disk-shaped first and second flange members 32 and 33 and a plurality of stick-shaped connection members 34 bringing the flange members 32 and 33 into connection, in a divided manner. Therefore, the process cost can be reduced by a large margin compared with the case where the connection members 34 are integrally formed with any one of the first and second flange members 32 and 33.

In addition, the first and second flange member 32 and 33 of the outer rotor 13 and the connection members 34 bringing the flange members 32 and 33 into connection are electrically insulated. Therefore, the closed circuit comprised of the first flange member 32, the connection member 34, the second flange member 33 and the other connection member 34 specified by arrows in FIG. 5 is shielded by the insulating portion during an operation of the electric motor M. Thereby, occurrence of eddy current is suppressed and heat dissipation and energy loss can be minimized. Moreover, four portions of the opposite ends of the two connection members 34 and 34 are insulating portions for one closed circuit. Therefore, even if insulations of three portions among those four portions are broken, the insulation between the first and second flange members 32 and 33 is secured and occurrence of eddy current can be suppressed.

In particular, not only the insulation can be secured even if one of insulation coatings a and b is damaged since insulation coatings a and b are formed for the opposite parties of the first and second flange members 32 and 33 and the connection members 34 but also electrical conduction between the first and second flange members 32 and 33 and the connection members 34 through the bolts 37 can also be securely prevented since insulation coating c is applied to the washer 38 of the bolts 37.

Figure 9:
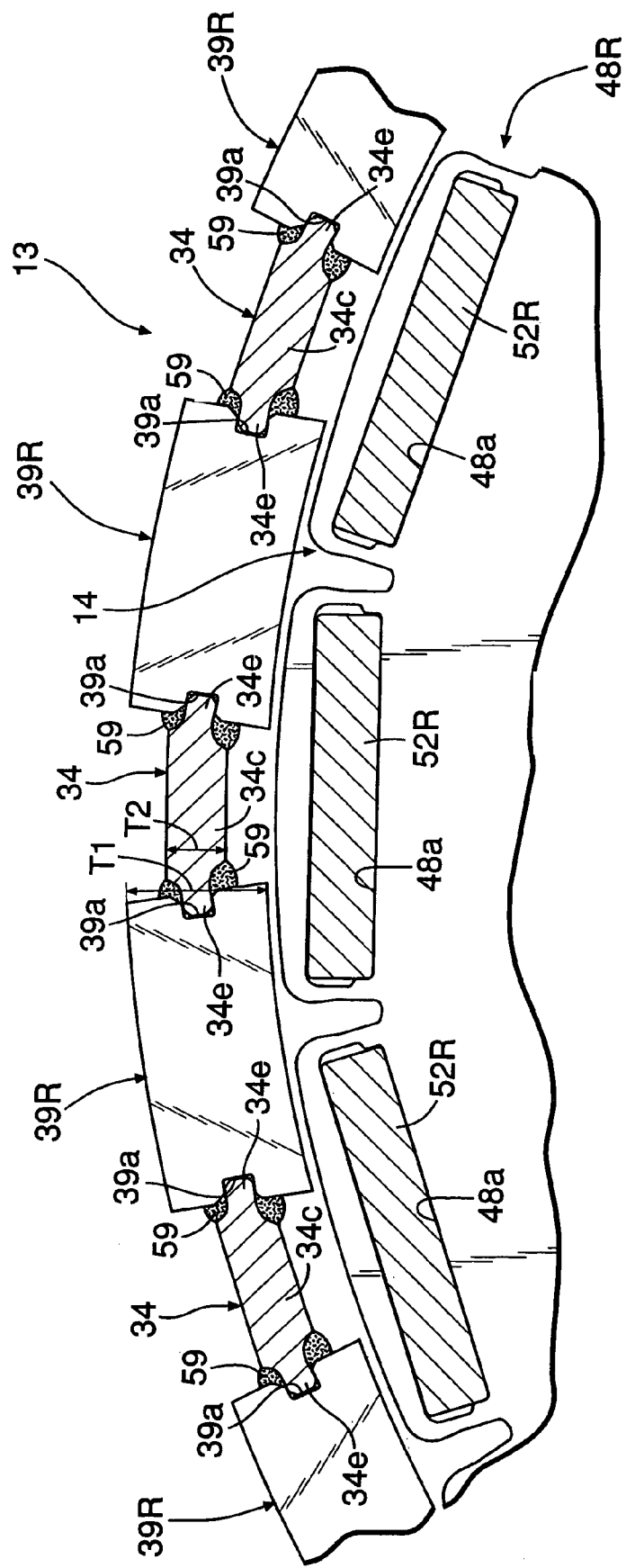
FIG. 9 is a sectional diagram taken along the line in FIG. 5.

In addition, as illustrated in FIG. 9, a thickness T2 of the induction magnetic pole supporting portion 34c of the connection member 34 in the radial direction is thinner than a thickness T1 of the first and second induction magnetic poles 39L and 39R brought into contact to the induction magnetic pole supporting portion 34c. Therefore, the sectional area of the connection member 34 is minimized to hardly allow magnetic flux to flow. Thereby, occurrence of eddy current can be suppressed.

Moreover, the first induction magnetic poles 39L and the second induction magnetic poles 39R are arranged with the same phase in the circumferential direction. Therefore, compared with the case where the first and second induction magnetic poles 39L and 39R are arranged with different phases in the circumferential direction, not only a structure of the rotor body 31 of the outer rotor 13 supporting the first and second induction magnetic poles 39L and 39R is simplified but also an strength of the rotor body 31 is improved.

Next, a second embodiment of the present invention will be described based on FIG. 21.

The connection member 34 of the first embodiment is a solid member. However, the connection member 34 of the second embodiment is configured to be hollow by welding two stainless plates, for example, subjected to a press working. That structure lightens the connection member 34 further and reduces its substantial sectional area. Thereby, eddy current can be reduced further.

Next, a third embodiment of the present invention will be described based on FIG. 22.

In the first embodiment, the first and second flange members 32 and 33 and the connection members 34 are comprised of different members. However, in the third embodiment, a half of the number of the connection members 34 is formed integrally with the first flange member 32. The remaining half thereof is formed integrally with the second flange member 33. The connection members 34 on the side of the first flange member 32 and the connection members 34 on the side of the second flange member 33 are alternately arranged in an assembled state. In that case, the material of the first and second flange members 32 and 33 is a weak magnetic material the same as the material of the connection members 34, that is, aluminum or aluminum alloy.

Also in that third embodiment, a portion where the connection members 34 on the side of the first flange member 32 are coupled with the second flange member 33 and a portion where the connection members 34 on the side of the second flange member 33 are coupled with the first flange member 32 are electrically insulated. Thereby an operating effect likewise the first embodiment is attainable.

Next, a fourth embodiment of the present invention will be described based on FIG. 23.

In the first embodiment, the first and second flange members 32 and 33 and the connection members 34 are comprised of different members. However, in the fourth embodiment, all the connection members 34 are formed integrally with the first flange member 32.

Also in that fourth embodiment, a portion where the connection members 34 on the side of the first flange member 32 are coupled with the second flange member 33 is electrically insulated. Thereby an operating effect likewise the first embodiment is attainable.

Figure 24:
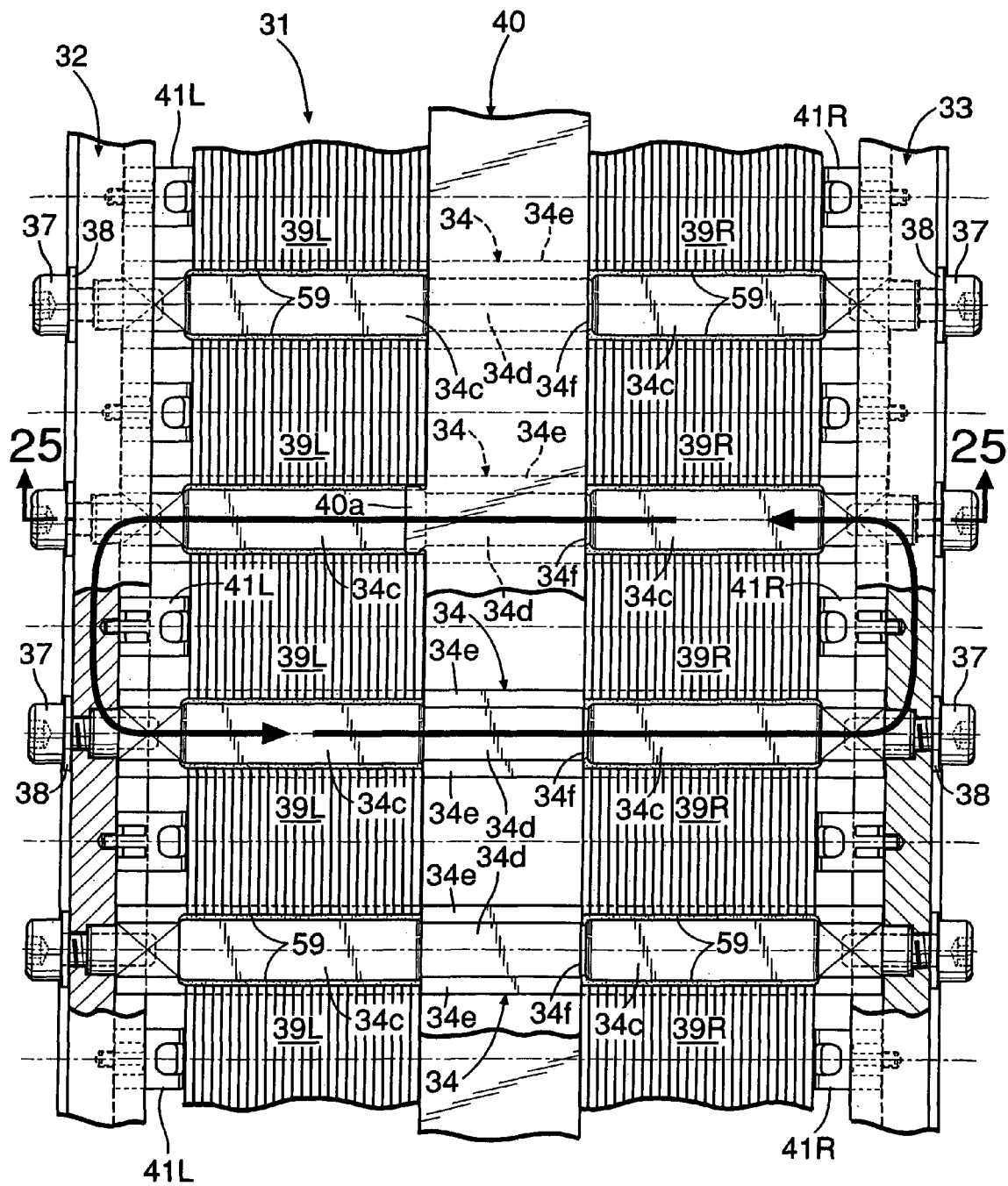
FIG. 24 is a diagram related to a fifth embodiment corresponding to FIG. 5.
Figure 25:
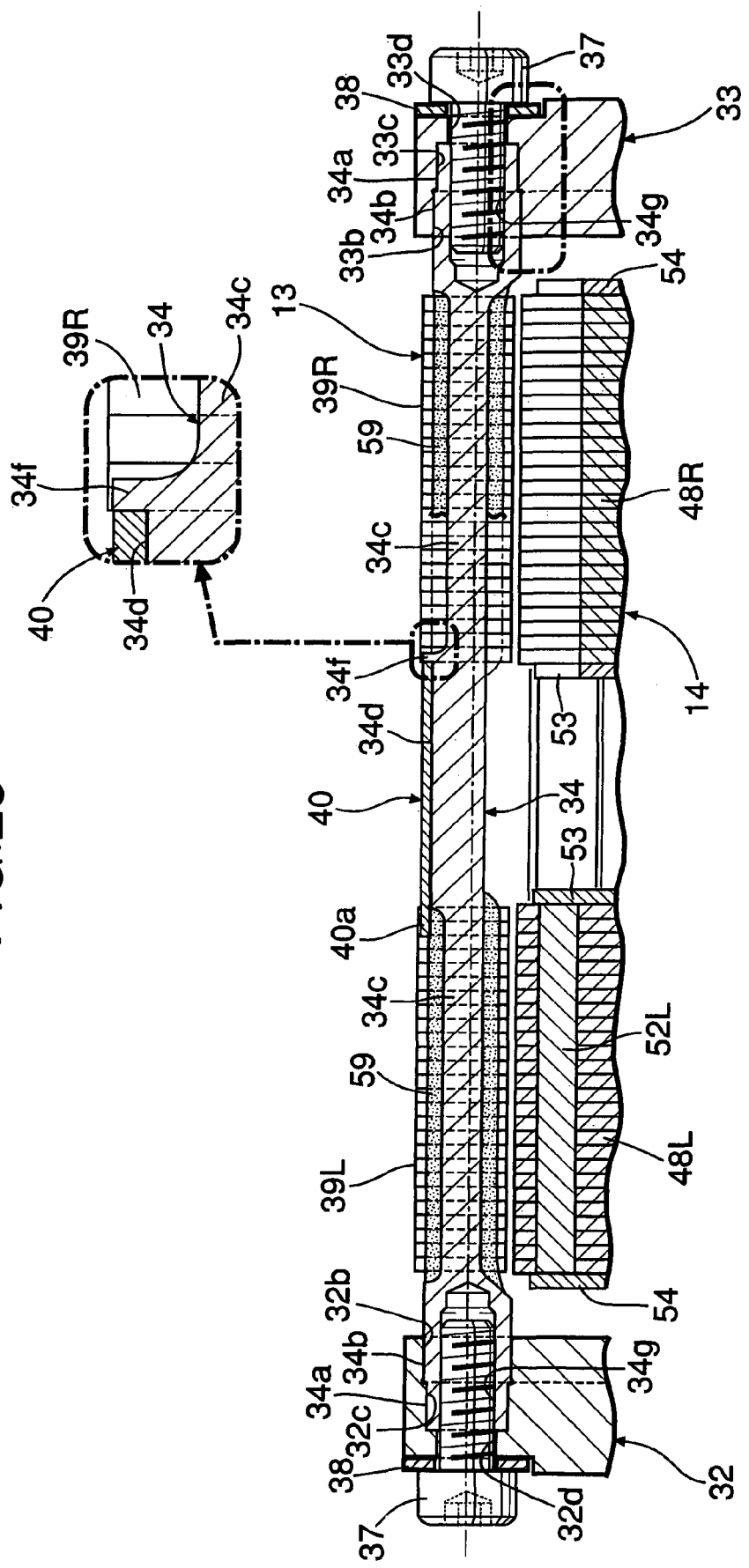
FIG. 25 is a sectional diagram taken along the line 25-25 in FIG. 24.
Figure 26:
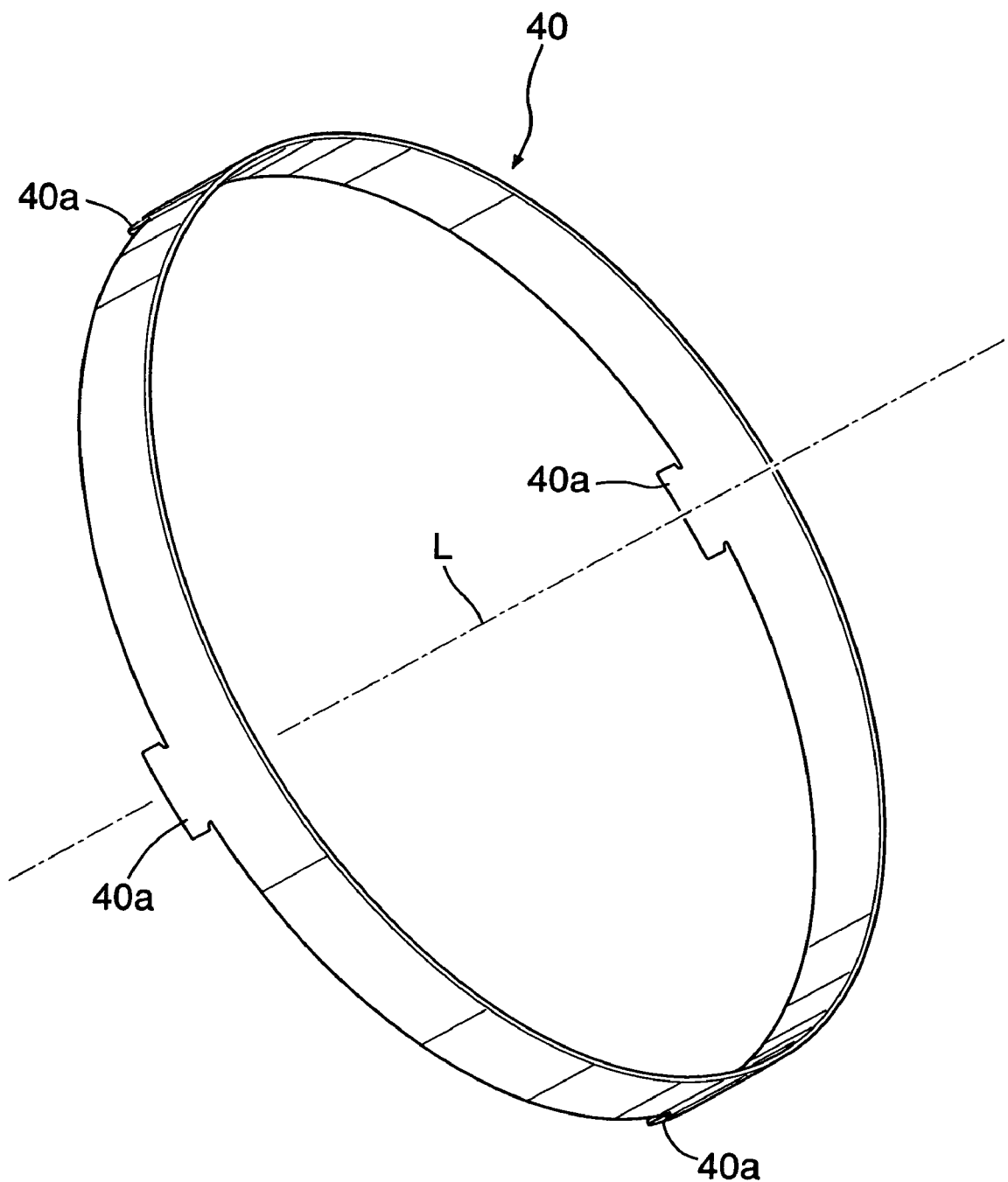
FIG. 26 is a perspective view of a ring.
Figure 27:
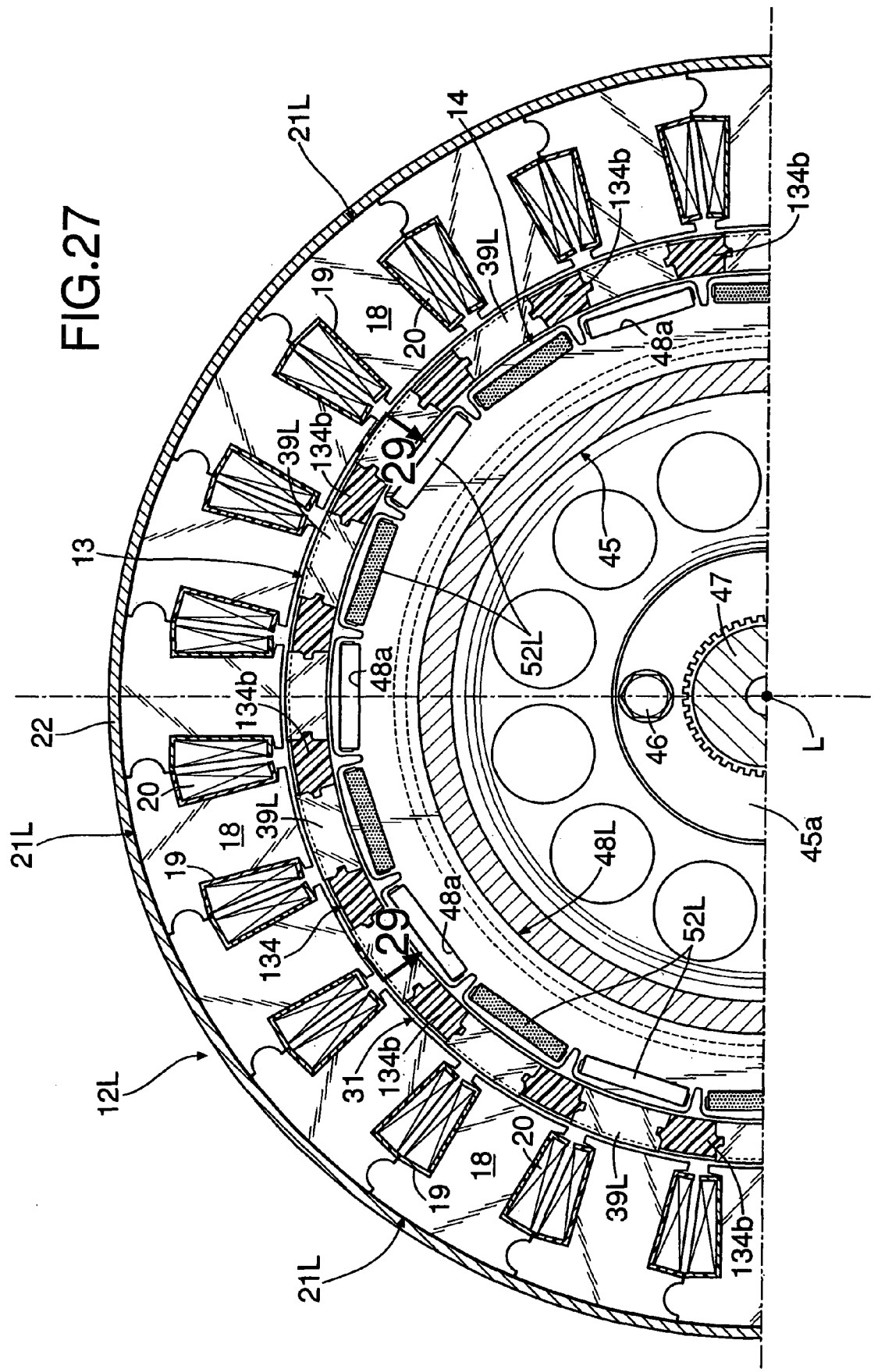
FIG. 27 is a diagram related to a sixth embodiment corresponding to FIG. 3.
Figure 28:
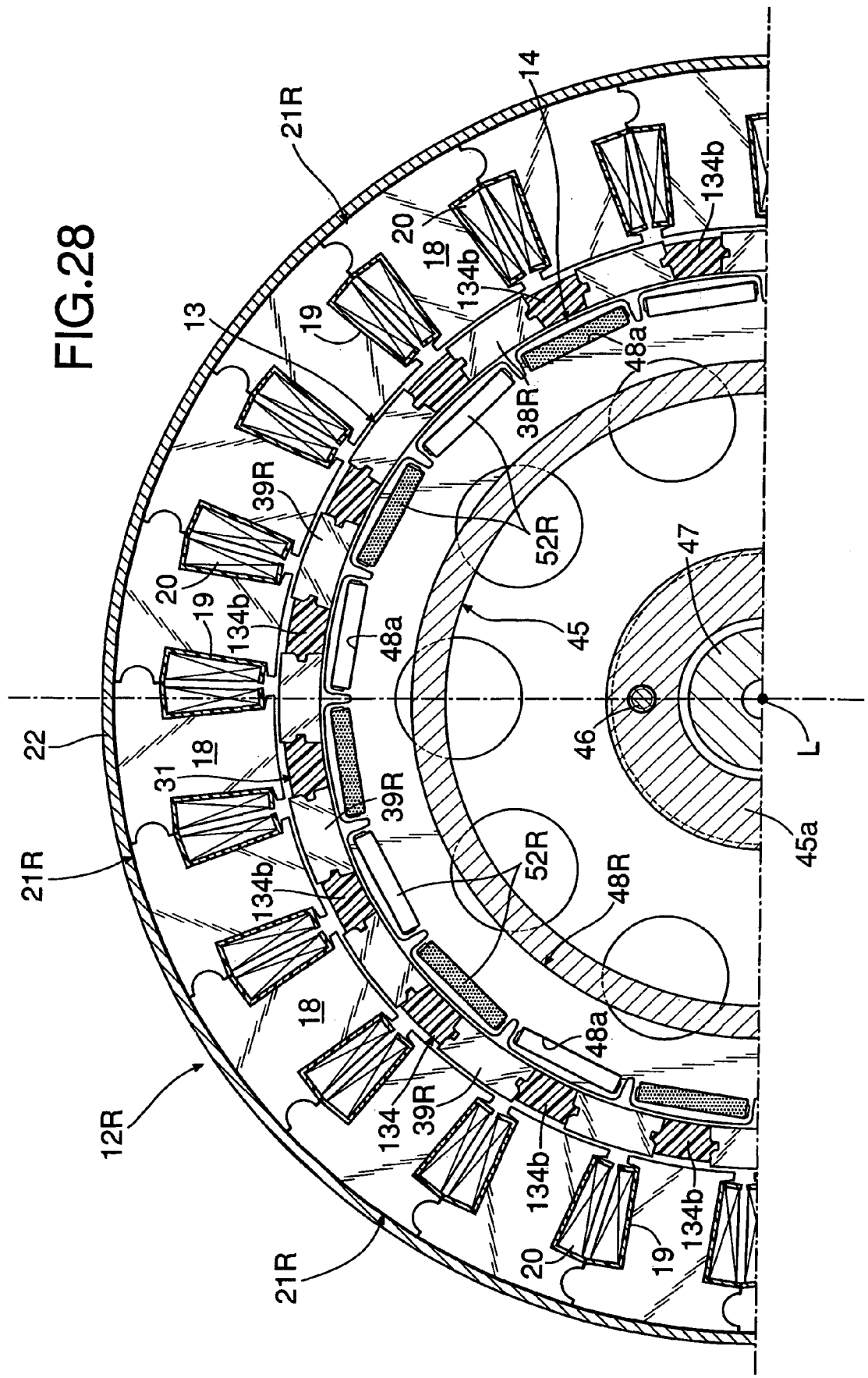
FIG. 28 is a diagram related to a sixth embodiment corresponding to FIG. 4.

Next, a fifth embodiment of the present invention will be described based on FIG. 24 to FIG. 26.

The ring 40 of the first embodiment comprises 20 positioning grooves 40b on the side edge on the side of the second flange member 33. However, the ring 40 of the fifth embodiment does not comprise the positioning grooves 40b but comprises, instead, four positioning protrusions 40a at equal distance of 90° therebetween on the side of the first flange member 32 of the ring 40. Each positioning protrusion 40a is brought into engagement between a pair of which are adjacent connection members 34 and 34 to position the ring 40 in the rotating direction.

By abandoning the positioning groove 40b, latching protrusion 34f of each connection member 34 is directly engaged with the side edge of the ring 40. However, the position of the latching protrusion 34f is set so that the load of the ring 40 biased by the elastic force of the first spring 41L is transmitted to the latching protrusions 34f but not transmitted to the second induction magnetic poles 39R.

Next, a sixth embodiment of the present invention will be described based on FIG. 27 to FIG. 33. Here, the sixth embodiment is different from the first embodiment in structure of the outer rotor 13 but is the same as the first embodiment for the other structure.

Figure 33:
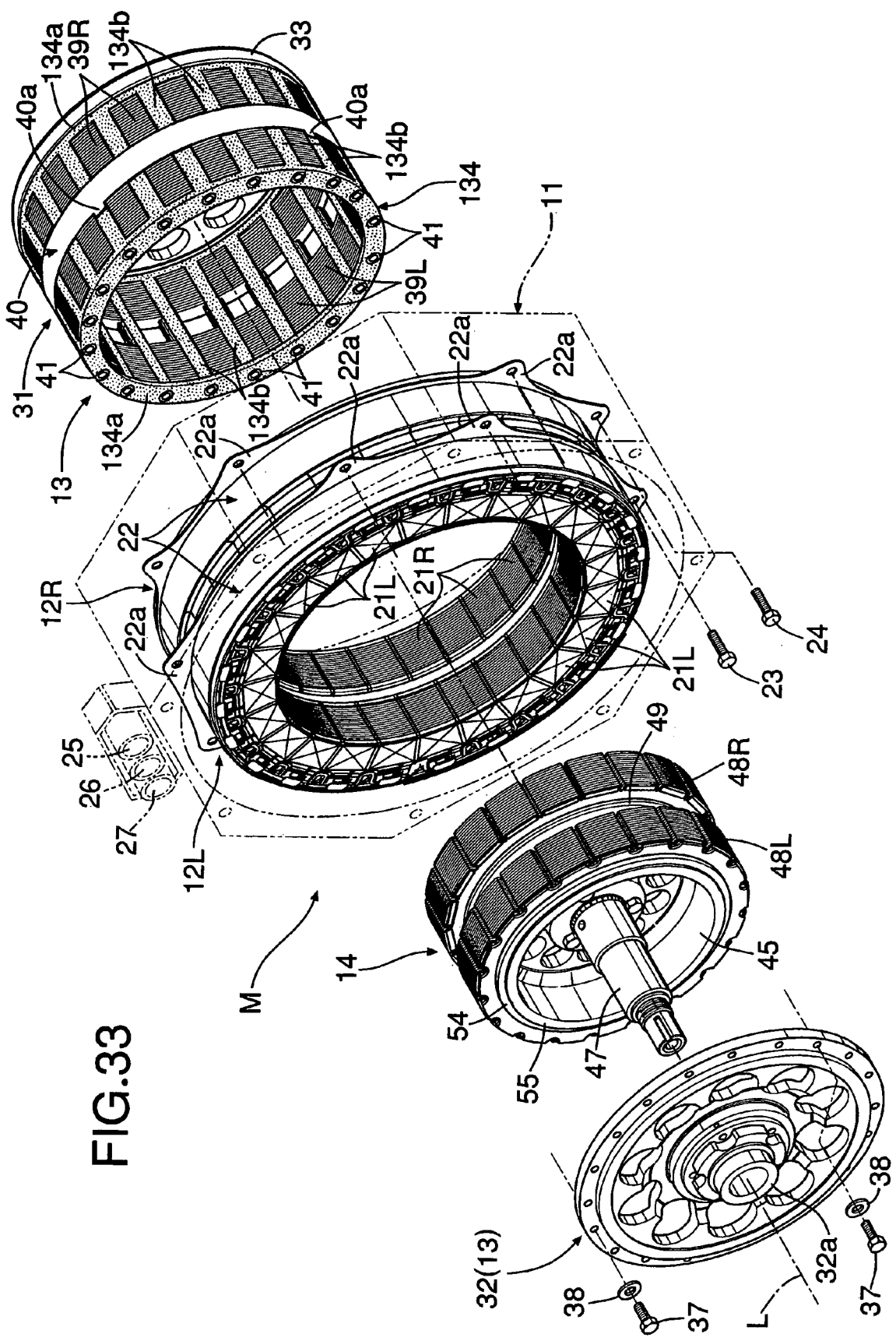
FIG. 33 is an exploded perspective view of an electric motor.

As illustrated in FIG. 33, the basket-shaped rotor body 31 of the outer rotor 13 is comprised of assembling disk-shaped first and second flange members 32 and 33 comprised of iron or iron steel being electrically conductive material and substantially cylindrically-shaped cylindrical member 134 comprised of electrically non-conductive resin. A first outer rotor shaft 32a protruding from the center of the first flange member 32 on the axis L is rotatably supported by the ball bearing 35 on the lid portion 17 of the casing 11. A second outer rotor shaft 33a protruding from the center of the second flange member 33 on the axis L is rotatably supported by the ball bearing 36 rotatably on the main body part 15 of the casing 11. The second outer rotor shaft 33a to become an output shaft of the outer rotor 13 extends outside through the main body part 15 of the casing 11.

The cylindrical member 134 integrally comprises a pair of toroidal fixing portions 134a and 134a formed on opposite ends of the cylindrical member 134 and a plurality of induction magnetic pole supporting portions 134b (20 pieces in the embodiment) being arranged in an equal distance in the circumferential direction to extend in the direction of the axis L and including the opposite ends being connected to the opposite fixing portions 134a and 134a. Nuts 41 are inserted into the pair of fixing portions 134a and 134a connected to the opposite ends of the induction magnetic pole supporting portions 134b in advance. The bolts 37 penetrating the first and second flange members 32 and 33 are screwed into the nuts 41 through the washer 38. Thereby, a basket-shaped rotor body 31, in which the cylindrical member 134 and the first and second flange members 32 and 33 are integrated, is configured. The bolts 37 and the nuts 41 are desirably comprised of weak magnetic material. Apparent from FIG. 29, a reason thereof is that the bolts 37 and the nuts 41 reach the portion configuring a magnetic path.

At that time, the cylindrical member 134 is comprised of electrically non-conductive resin. Therefore, the first and second flange members 32 and 33 are mutually electrically insulated. Consequently, an electrical closed circuit (see arrows in FIG. 29) configured through the first flange member 32, the induction magnetic pole supporting portions 134b of the cylindrical member 134, the second flange member 33 and the other induction magnetic pole supporting portions 134b of the cylindrical member 134 can be reliably shielded. Thereby, occurrence of an eddy current in the closed circuit is prevented. Thereby, heat dissipation and energy loss can be minimized.

As illustrated in FIG. 27 to FIG. 33, 20 slits extending in parallel along the axis L are formed between 20 induction magnetic pole supporting portions 134b of the cylindrical member 134. The first induction magnetic pole 39L and the second induction magnetic pole 39R made of soft magnetic material are supported in respective slits. The first and second induction magnetic poles 39L and 39R are integrally inserted at the occasion of carrying out metal mold of the cylindrical member 134. The outer peripheral face and the inner peripheral face of the first and second induction magnetic poles 39L and 39R are exposed from the outer peripheral face and the inner peripheral face of the cylindrical member 134.

Figure 29:
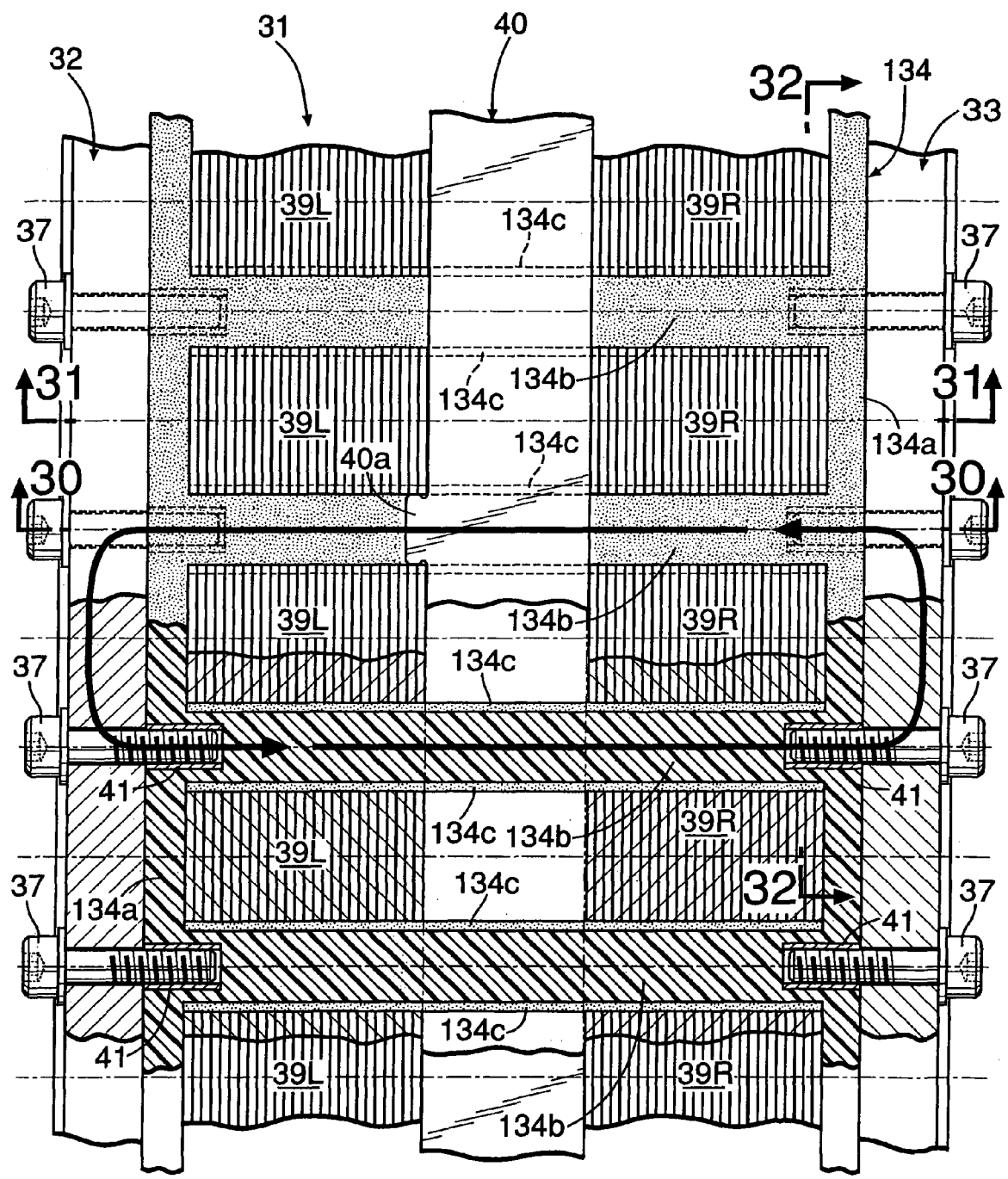
FIG. 29 is a view taken along the arrow direction of the line 29-29 in FIG. 27.
Figure 32:
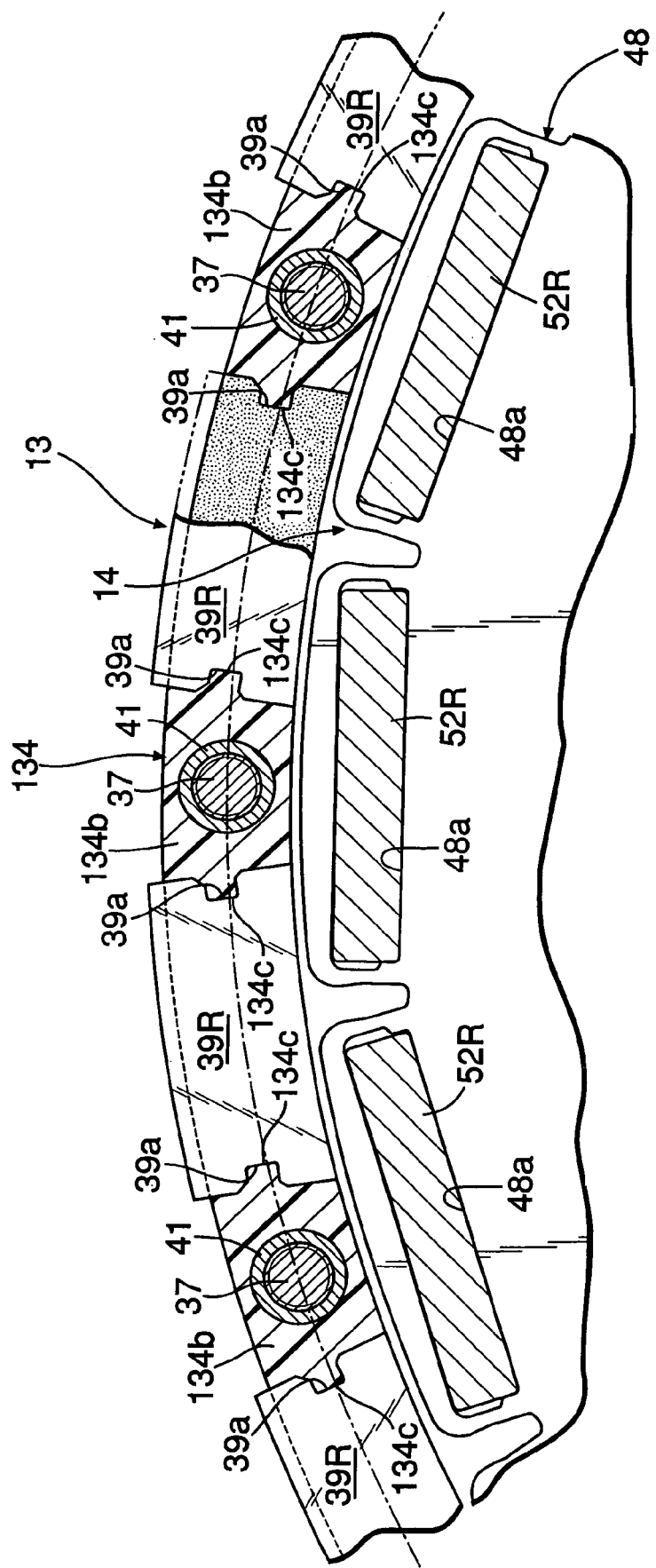
FIG. 32 is a sectional diagram taken along the line 32-32 in FIG. 29.

As illustrated in FIG. 29 and FIG. 32, the first and second induction magnetic poles 39L and 39R are comprised of a great number of steel plates stacked in the direction of the axis L. Concave portions 39a and 39a having a quadrangular shape in section are formed on the opposite side surfaces along the axis L. Those concave portions 39a and 39a are engaged with the convex portions 134c and 134c of the induction magnetic pole supporting portions 134b of the cylindrical member 134 positioned on the opposite sides thereof to establish convexo-concave engagement. Thereby, the first and second induction magnetic poles 39L and 39R are prevented from dropping out in the radial direction.

As illustrated in FIG. 29 and FIG. 33, the ring 40, which is made of a belt-shaped metal plate of a weak magnetic material (non-magnetic material) and annularly formed, is fit to the outer periphery of the center of the cylindrical member 134. The ring 40 is fit between the first induction magnetic poles 39L and the second induction magnetic poles 39R. Four rotation-stopping protrusions 40a provided at equal distance of 90° therebetween on the side edge thereof are engaged between the which are adjacent first induction magnetic poles 39L so that the ring 40 is held against rotation in the circumferential direction.

Figure 30:
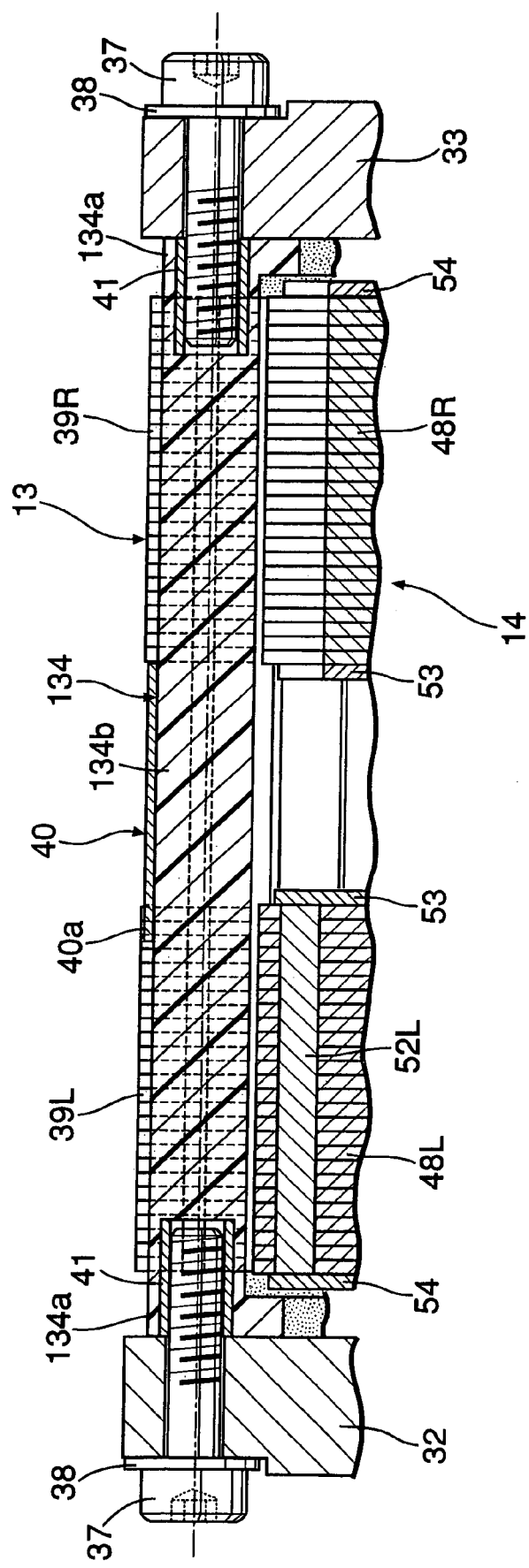
FIG. 30 is a sectional diagram taken along the line 30-30 in FIG. 29.
Figure 31:
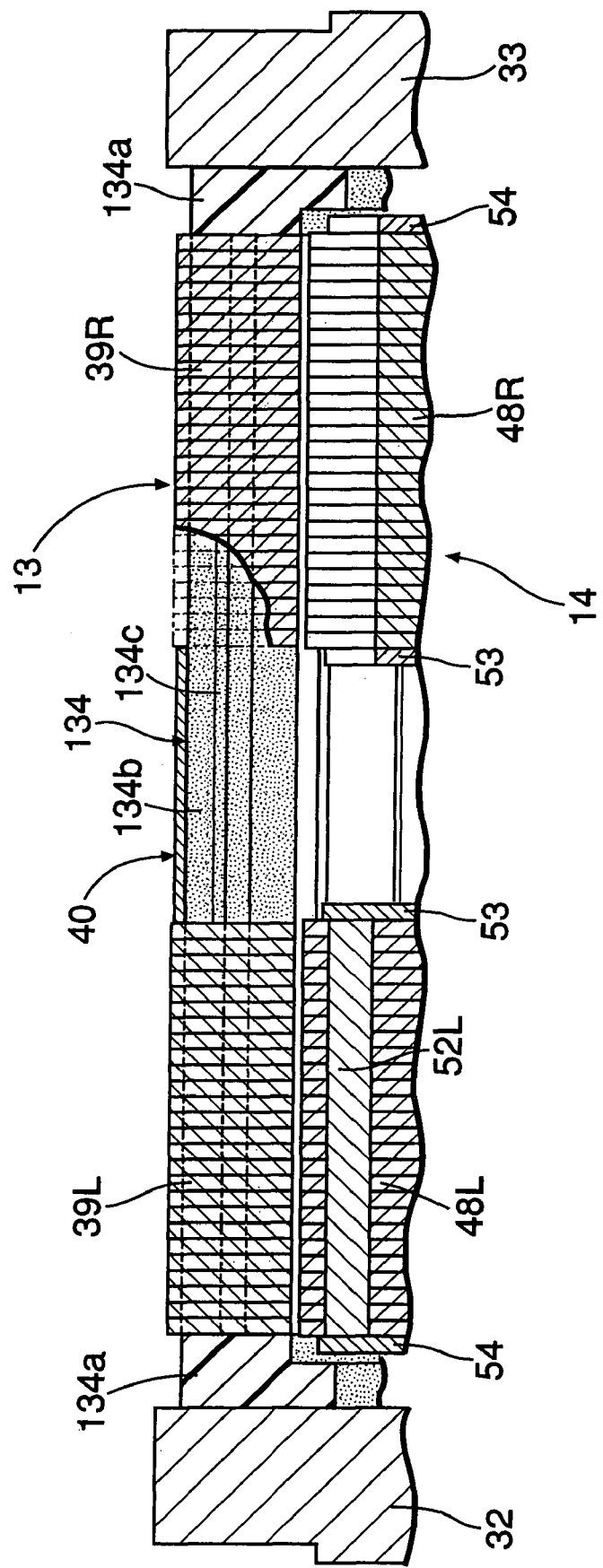
FIG. 31 is a sectional diagram taken along the line 31-31 in FIG. 29.

As illustrated in FIG. 30 and FIG. 31, when the outer rotor 13 rotates, centrifugal force applied to the first and second induction magnetic poles 39L and 39R tries to deflect the cylindrical member 134 to the radially outside. However, by pushing the center part of the cylindrical member 134 in the direction of the axis L with the ring 40 radially inwards, deformation of the cylindrical member 134 can be effectively suppressed to enable rapid-rotation of the outer rotor 13. In particular, the ring 40 is arranged between the first induction magnetic poles 39L and the second induction magnetic poles 39R. Therefore, centrifugal force applied to the first and second induction magnetic poles 39L and 39R having heavy weight can be effectively supported.

According to the present embodiment, the cylindrical member 134 of the outer rotor 13 is integrally molded with resin by metal mold. Therefore, the number of parts of the cylindrical member 134 itself can be reduced. Furthermore, a mass productivity of the rotor can be improved so that reduction in cost can be accomplished since the first and second induction magnetic poles 39L and 39R are embedded for fixing inside the cylindrical member 134 at the occasion of molding the cylindrical member 134 by metal mold and, therefore, a special fixing member for fixing the first and second induction magnetic poles 39L and 39R onto the cylindrical member 134 is no longer required.

In addition, the first and second induction magnetic poles 39L and 39R are exposed on the outer peripheral face and the inner peripheral face of the cylindrical member 134. Therefore, it is possible to reduce an air gap between the first and second armatures 21L and 21R of the first and second stators 12L and 12R or an air gap between the first and second permanent magnets 52L and 52R of the inner rotor 14 to enable improvement in magnetic efficiency.

Figure 34:
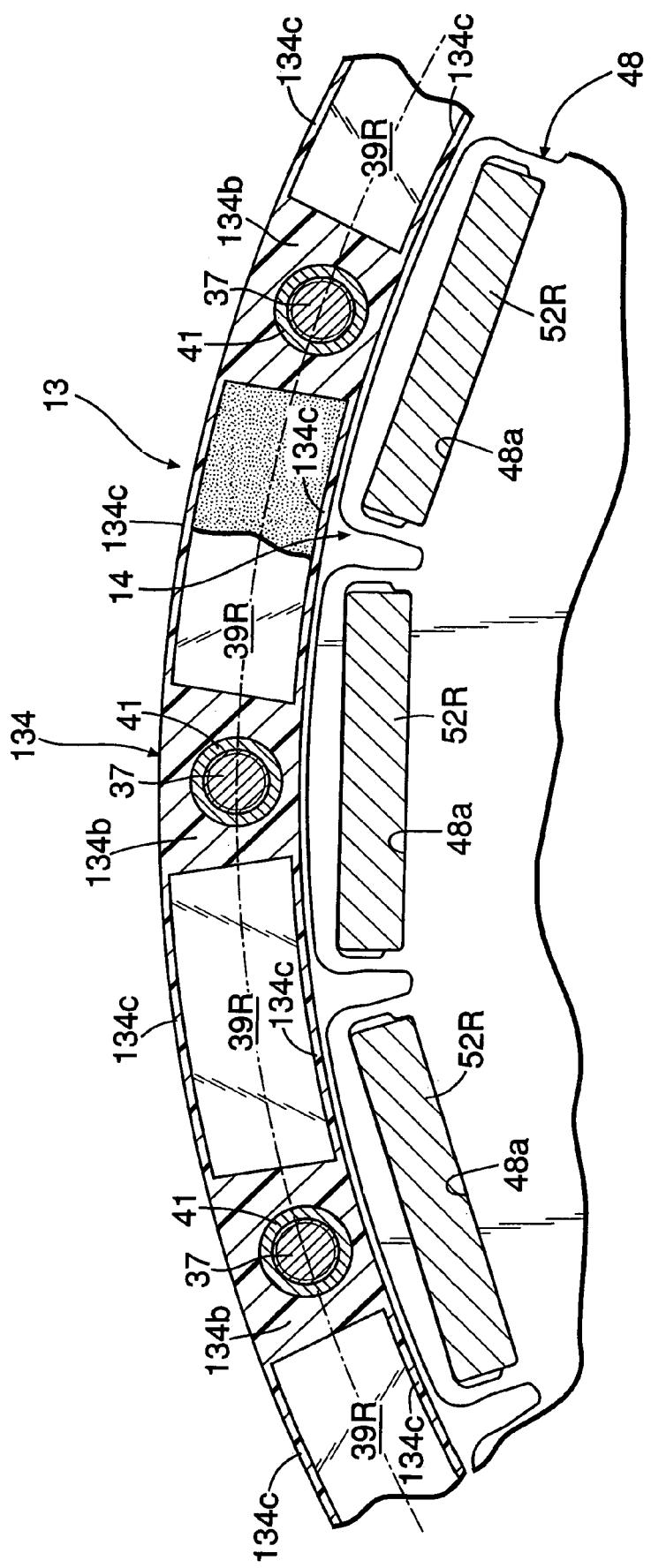
FIG. 34 is a diagram related to a seventh embodiment corresponding to FIG. 32.

Next, a seventh embodiment of the present invention will be described based on FIG. 34.

In the sixth embodiment, the outer peripheral face and the inner peripheral face of the first and second induction magnetic poles 39L and 39R supported between the adjacent induction magnetic pole supporting portions 134b of the cylindrical member 134 are exposed. However, in the seventh embodiment, the outer peripheral face and the inner peripheral face of the first and second induction magnetic poles 39L and 39R are completely covered by thin resin films 134d bridging the induction magnetic pole supporting portions 134b which are adjacent so as to be invisible from outside. That structure eliminate such anxiety that the first and second induction magnetic poles 39L and 39R may be flown off to outside due to centrifugal force so that it is not necessary to establish a convexo-concave engagement between the induction magnetic pole supporting portions 134b and the first and second induction magnetic poles 39L and 39R.

So far, the embodiments of the present invention have been described. However, various kinds of modification in designing can be made within the scope not departing the gist of the present invention.

For example, the embodiments are exemplified by the electric motor M. However, the present invention is applicable to a generator with one of an outer rotor and an inner rotor being fixed and the other being caused to rotate and thereby causing a stator to generate electromotive force, and a so-called magnetic gear with a stator provided with a permanent magnet to transmit drive force among three members of an outer rotor, an inner rotor and the stator.

In addition, in the embodiments, the stators 12L and 12R arranged radially outside are provided with armatures 21L and 21R and the inner rotor 14 arranged radially inside is provided with permanent magnets 52L and 52R. However, the positional relation between armatures 21L and 21R and the permanent magnets 52L and 52R can be reversed.

In addition, in the embodiments, insulation coating is applied to all of the first flange member 32, the second flange member 33 and the connection members 34. However, if insulation coating is applied to any one or two of the first flange member 32, the second flange member 33 and the connection members 34, the closed circuit where an eddy current flows can be shielded.

In addition, in the embodiments, aluminum or aluminum alloy is used for the first and second flange members 32 and 33 and the connection members 34 of the outer rotor 13. However, instead, titan, titan alloy, stainless and the like can be used.

Aluminum or aluminum alloy is inexpensive and light in weight and can be processed easily. Moreover, aluminum or aluminum alloy has a feature to easily undergo insulation coating only by applying anodized aluminum treatment. However, it gives rise to a problem that resistance value is low and therefore an eddy current is apt to flow.

Titanium or titanium alloy has high resistance value and, therefore, hardly allows an eddy current to flow and, moreover, is highly strong compared with its weight and, therefore, is featured by its capability of lightening the outer rotor 13, giving rise, however, to a problem that material and insulation coating are expensive.

Stainless has much higher resistance value than titanium or titanium alloy has and, therefore, hardly allows an eddy current to flow and is featured by its comparatively inexpensive material and by being comparatively easily processed, giving rise, however, to a problem that its weight is heavy; electrical property is unstable (there is a possibility that it may become magnetic material by heat treatment and the like); and insulation coating is expensive.

In addition, in the embodiments, all the portions where the first and second flange members 32 and 33 and the connection members 34 are brought into coupling are insulated. However, if at least one portion of the four coupling portions being present in the closed circuit where an eddy current flows is insulated, the expected object can be attained.

In addition, in the embodiments, the first and second flange members 32 and 33 are fixed to the connection members 34 with bolts 37. However, the fixing means is not limited to the bolts 37 but arbitrary means such as caulking, pressure insertion, riveting, clipping and welding is adoptable.

In addition, in the embodiments, resin is used for the cylindrical member 134 of the outer rotor 13. However, any non-electrically conductive material besides resin is adoptable.

In addition, in the embodiments, the first and second springs 41L and 41R formed by leaf springs are adopted as elastic member. However, the structure of the first and second springs 41L and 41R is arbitrarily selected.

What is claimed is:

1. A rotor for a rotating electrical machine, comprising:
    a first flange member and a second flange member arranged so as to be capable of rotating around a common axis;
    a plurality of connection members arranged at predetermined distances therebetween in a circumferential direction with the axis being a center to connect outer peripheral portions of the first and second flange members together; and
    magnetic poles supported between the connection members which are adjacent in the circumferential direction,
    wherein the magnetic poles are movably supported by the connection members in the direction of the axis and the magnetic poles are biased and fixed in the direction of the axis with elastic members arranged between the magnetic poles and at least one of the first and second flange members,
    wherein a ring is arranged in a radially outer periphery of the connection member, and
    wherein at least one rotation-stopping protrusion is provided to protrude on a side edge of the ring.

2. The rotor for a rotating electrical machine according to claim 1,
    wherein the magnetic poles comprise induction magnetic poles made of a soft magnetic material.

3. The rotor for a rotating electrical machine according to claim 1,
    wherein the magnetic pole comprises a first magnetic pole and a second magnetic pole which are arranged in parallel in the direction of the axis and said ring is sandwiched by the first and second magnetic poles to function as a spacer.

4. The rotor for a rotating electrical machine according to claim 3,
wherein a first elastic member is arranged between the first flange member and the first magnetic pole, and a second elastic member is arranged between the second flange member and the second magnetic pole.

5. The rotor for a rotating electrical machine according to claim 4,
wherein the rotation-stopping protrusion is brought into engagement between a pair of the adjacent first magnetic poles or between a pair of the adjacent second magnetic poles.

6. The rotor for a rotating electrical machine according to claim 4,
wherein a latching protrusion engaged with a side edge of the ring on a side of the second flange member is provided in at least one of the connection members and elastic force of the first elastic member is set stronger than elastic force of the second elastic member.

7. The rotor for a rotating electrical machine according to claim 6,
wherein a positioning groove is formed on a side edge of the ring on a side of the second flange member and the latching protrusion is engaged with the positioning groove.

* * * * *